(12) United States Patent
Carnahan et al.

(10) Patent No.: US 11,457,015 B2
(45) Date of Patent: *Sep. 27, 2022

(54) ENHANCED VALUE COMPONENT PREDICTIONS USING CONTEXTUAL MACHINE-LEARNING MODELS

(71) Applicant: Live Nation Entertainment, Inc., Beverly Hills, CA (US)

(72) Inventors: John Carnahan, Los Angeles, CA (US); Mathieu Rodrigue, Los Angeles, CA (US)

(73) Assignee: Live Nation Entertainment, Inc., Beverly Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/062,773

(22) Filed: Oct. 5, 2020

(65) Prior Publication Data
US 2021/0160244 A1 May 27, 2021

Related U.S. Application Data

(63) Continuation of application No. 16/714,154, filed on Dec. 13, 2019, now Pat. No. 10,798,099.

(Continued)

(51) Int. Cl.
*H04L 9/40* (2022.01)
*G06F 16/903* (2019.01)
(Continued)

(52) U.S. Cl.
CPC .......... *H04L 63/102* (2013.01); *G06F 16/903* (2019.01); *G06F 21/604* (2013.01); *G06F 21/62* (2013.01); *G06F 21/6209* (2013.01); *G06F 21/6218* (2013.01); *G06N 20/00* (2019.01); *H04L 63/205* (2013.01)

(58) Field of Classification Search
CPC .. G06F 21/62; G06F 21/6209; G06F 21/6218; G06F 21/6238; G06F 21/629; G06F 21/60; G06F 21/604; G06F 21/30; G06F 21/45; G06F 16/903; H04L 63/20; H04L 63/205; H04L 63/102; G06N 20/00
See application file for complete search history.

(56) References Cited

U.S. PATENT DOCUMENTS

| 10,798,099 | B2 | 10/2020 | Carnahan et al. |
| 2007/0055554 | A1 | 3/2007 | Sussman et al. |
| 2010/0217679 | A1* | 8/2010 | Eckstein ............. G06Q 20/102 705/26.1 |

OTHER PUBLICATIONS

U.S. Appl. No. 16/714,154 received a First Action Interview Pilot Program Pre-Interview Communication dated Mar. 19, 2020. 4 pages.

(Continued)

*Primary Examiner* — Edward Zee
(74) *Attorney, Agent, or Firm* — Kilpatrick Townsend & Stockton, LLP

(57) ABSTRACT

The present disclosure generally relates to systems and methods that intelligently generate reassignment value conditions for reassigning access rights. The systems and methods include executing a trained contextual machine-learning model to generate predictions of value components of the reassignment value condition, which once satisfied, enables an access-right requestor to have an assigned access right reassigned to the access-right requestor.

20 Claims, 16 Drawing Sheets

Related U.S. Application Data

(60) Provisional application No. 62/779,750, filed on Dec. 14, 2018.

(51) Int. Cl.
*G06F 21/62* (2013.01)
*G06N 20/00* (2019.01)
*G06F 21/60* (2013.01)
*G06F 21/00* (2013.01)

(56) References Cited

OTHER PUBLICATIONS

U.S. Appl. No. 16/714,154 received a Notice of Allowance dated May 28, 2020, 8 pages.

* cited by examiner

ENHANCED VALUE COMPONENT PREDICTIONS USING CONTEXTUAL MACHINE-LEARNING MODELS

CROSS-REFERENCE TO RELATED APPLICATIONS

This application is a continuation of U.S. application Ser. No. 16/714,154, filed Dec. 13, 2019, which claims the priority benefit of U.S. Provisional Application No. 62/779,750, filed Dec. 14, 2018, the disclosures of each of which are hereby incorporated by reference in their entirety for all purposes.

TECHNICAL FIELD

The present disclosure generally relates to systems and methods that execute reinforcement learning techniques to assign value. More particularly, the present disclosure relates to systems and methods that generate a contextual model to continuously return values assignable to access rights to resources in a manner that maximizes a target objective.

BACKGROUND

Access rights to resources can be assigned to users. A user with an assigned access right can access the resource within a defined time period. Often, an access right assigned to a user can be reassigned to another user using a reassignment platform. The reassignment platform can enable the user to reassign an access right for a certain value. That value, however, often has multiple components. Determining the value of one or more of the multiple components is technically challenging and often computationally inefficient. For example, one of the components that make up the value may be determined by the reassignment platform. The reassignment platform, however, may determine a value for the component based on collected data. The data collection is often computationally inefficient or excessively time consuming to extract. For example, the value for the component may be based on data collected or aggregated once a month. The delayed data collection and subsequently the evaluation of the collected data cause the determination of the value for the component to be sub-optimal. Given the big-data scale of the data collected for determining the value of the component, traditional approaches for value determination of one or more of the components for access rights on the reassignment platform are not computationally efficient and may not generate accurate values.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Access rights to resources are assigned by primary load management systems. For example, assigning an access right by the primary load management system may include generating, storing at a database, and managing an access-enabling code that facilitates access to the resource corresponding to the access right during a defined time period. Users can access the primary load management system to request assignment of one or more access rights to a resource. In some examples, the primary load management system may provide an assignment platform (e.g., an online platform, such as a web application) configured to enable users to request assignment of access rights (e.g., electronic tickets) to resources (e.g., events). The primary load management system may define an assignment value condition (e.g., a price of an electronic ticket issued directly by issuer) for assigning an access right to a user. If the user satisfies the assignment value condition (e.g., submits the price), then the primary load management system assigns the access right to the user.

In some situations, however, users who previously were assigned access rights by the primary load management system may want to reassign the access rights to other users for various reasons (e.g., because the user assigned to the access right can no longer access the resource during the corresponding defined time period). In these situations, the primary load management system may operate a secondary load management system that enables users to request that certain already-assigned access rights be reassigned to another user. The request for reassignment may be generated using a website or a native application that provides users with query functionality to query databases storing already-assigned access rights that are available for reassignment. An assigned access right may be available for reassignment using the secondary load management system if the user to which the access right is assigned indicates to the secondary load management system that the assigned access right is available to be reassigned to another user who satisfies a reassignment value condition (e.g., a resale price for the access right).

To reassign an access right using the secondary load management system, an access-right requestor (e.g., potential buyer) may satisfy a reassignment value condition for an assigned access right that is available for reassignment. The secondary load management system may operate a reassignment platform (e.g., cloud-based a web application or native application) that enables users to request reassignment of available access rights that are already assigned to other users. The secondary load management system may determine the reassignment value condition for reassigning access rights in an intelligent manner using machine-learning techniques. To illustrate and as only a non-limiting example, the reassignment value condition for reassigning an access right may be a combination of multiple value components. A first value component of the reassignment value condition may be a holder's component (e.g., a seller's fee); a second value component of the reassignment value condition may be a requestor's component (e.g., a buyer's fee); and a third value component of the assigned access right may include a multiplier value (e.g., a markup value). The reassignment value condition that users may need to satisfy before the assigned access rights can be reassignment may be a combination of the first value component, the second value component, and the third value component. For example, combining the first value component, the second value component, and the third value component may include a weighed combination, a multiplication, an aggregation, and other suitable combination techniques.

One or more of the value components of the reassignment value condition may be defined by the second load management system. Certain embodiments of the present disclosure relate to systems and methods that intelligently predict the one or more value components of the reassignment value condition using machine-learning and/or artificial-intelligence (AI) techniques. Certain embodiments include a value determination system configured to automatically determine the one or more value components of the reassignment value condition for an assigned access right using machine-learning or AI-models and contextual information characterizing the user requesting reassignment of the access right (e.g., the reassignment being made to the user). In some implementations, the value determination system may generate a contextual machine-learning model configured to output representing a value component that is optimized for the access-right requestor. Further, in some implementations, a reinforcement learner may be implemented to explore different values components with a given probability to continuously update the value components. More specifically, in some implementations, the value determination system may execute a contextual multi-armed bandit learner to continuously select a value component with probability P from a group of potential value components, and to randomly explore a set of different value components with probability 1−P from the group of potential value components. In some implementations, the value determination system can include a feedback loop that receives signals from users (e.g., a feedback signal indicating that a user completed a reassignment request of an assigned access right by satisfying the reassignment value condition with a particular value component). Further, the value determination system may reevaluate both the value components and the probabilities of using those value components (e.g., probability P). Based on the feedback signals received from real-time access right reassignments performed by the secondary load management system, the value determination system can adjust the distribution of value components to a different probabilistic allocation.

In some implementations, the contextual machine-learning model can be generated using one or more contextual multi-armed bandit algorithms. Advantageously, the data set collected by the primary load management system can be used to train the contextual machine-learning model. The data set collected by the primary load management system may include characteristics of access-right assignments to users performed by the primary load management system and/or access-right reassignments to users performed by the secondary load management system. For example, since users of various types (e.g., ranging from new users to long-time users of the secondary load management system) may request reassignment of access rights through the primary load management system, the characteristics collected from those reassignment requests (e.g., user information, such as location, previous access right assignments or reassignments, and so on) can be evaluated using one or more contextual machine-learning or AI models to detect patterns within the data set. The collected data set and the identified patterns within the data set can be analyzed and used for training the contextual machine-learning model, so that the contextual machine-learning model can be executed to generate accurate predictions of the value component(s) of the reassignment value condition for an assigned access right. Advantageously, the contextual machine-learning model can solve the "cold start" or "thin data" problem associated with new users.

In some implementations, a reinforcement learner (e.g., an exploration strategy with a certain probability of exploratory actions) can be used to explore in real-time which value components may yield suitable results. For example, a reinforcement learner can automatically select a specific value component, from various value components, at a probability 1−P, where P is the probability of selecting the current state value component, and where 1−P is the probability of selecting the exploration state value component. Further, the predicted value component (e.g., the value component selected using reinforcement learning) may be added to other value components to generate the reassignment value condition of the assigned access right. The value determination system can receive the feedback signals from all reassigned access rights (for which the reassignment of the access right has completed and the assigned access right has been reassigned) to determine which value components were successful (e.g., indicated by users completing the access right reassignment) and/or which value components failed (e.g., indicated by users exiting the reassignment process potentially because the value component was too high).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method, including: collecting, at a primary load management system, a data set from a plurality of user devices, the data set including one or more attributes associated with an interaction between a user device of the plurality of user devices and the primary load management system; receiving, at a secondary load management system, a communication from an access-right requestor device, the communication enabling the access-right requestor device to request reassignment of access rights to resources using the secondary load management system, and the access-right requestor device being operated by an access-right requestor. The computer-implemented method also includes displaying, at the access-right requestor device, an interface that enables the access-right requestor device to generate a query for one or more databases storing a set of assigned access rights to one or more resources, and each assigned access right of the set of assigned access rights having been assigned to an access-right holder and being available for reassignment to other users. The computer-implemented method also includes receiving, at the interface, a constraint for querying the one or more databases, the constraint being received from the access-right requestor device. The computer-implemented method also includes querying the one or more databases using the constraint, the querying causing one or more assigned access rights of the set of assigned access rights to be identified, each assigned access right of the one or more assigned access rights satisfying the constraint. The computer-implemented method also includes displaying, at the interface, the one or more assigned access rights that satisfy the constraint. The computer-implemented method also includes receiving a signal from the access-right requestor device, the signal requesting that a particular assigned access right of the one or more assigned access rights be reassigned to the access-right requestor, the particular assigned access right having been assigned to a particular access-right holder and granting access to the particular access-right holder to access a particular resource. The computer-implemented method also includes in response to receiving the signal from the access-right requestor device, generating a context vector associated with the access-right requestor, the context vector being generated based on one or more features associated with the access-right requestor, the access-right requestor device, or the particular assigned access right. The computer-implemented method also includes evaluating the context vector using a trained contextual machine-learning model, the trained contextual machine-learning model having been trained using the collected data set, the evaluation of the context vector using the trained contextual machine-learning model resulting in generating an output corresponding to a prediction of a value to use as a value component of a reassignment value condition specific to the particular assigned access right, the reassignment value condition being defined by combining one or more value components, and the reassignment value condition, once satisfied, enabling the reassignment of the particular assigned access right. The computer-implemented method also includes displaying, at the interface, the reassignment value condition of the particular assigned access right, the reassignment value condition being determined based on a combination of the one or more value components including the predicted value used as the value component, and the reassignment value condition, once satisfied, enabling the particular assigned access right to be reassigned from the particular access-right holder to the access-right requestor. Other embodiments of this aspect include corresponding computer systems, apparatus, and computer programs recorded on one or more computer storage devices, each configured to perform the actions of the methods.

BRIEF DESCRIPTION OF THE DRAWINGS

The specification makes reference to the following appended figures, in which use of like reference numerals in different figures is intended to illustrate like or analogous components.

DETAILED DESCRIPTION

Figure 1:
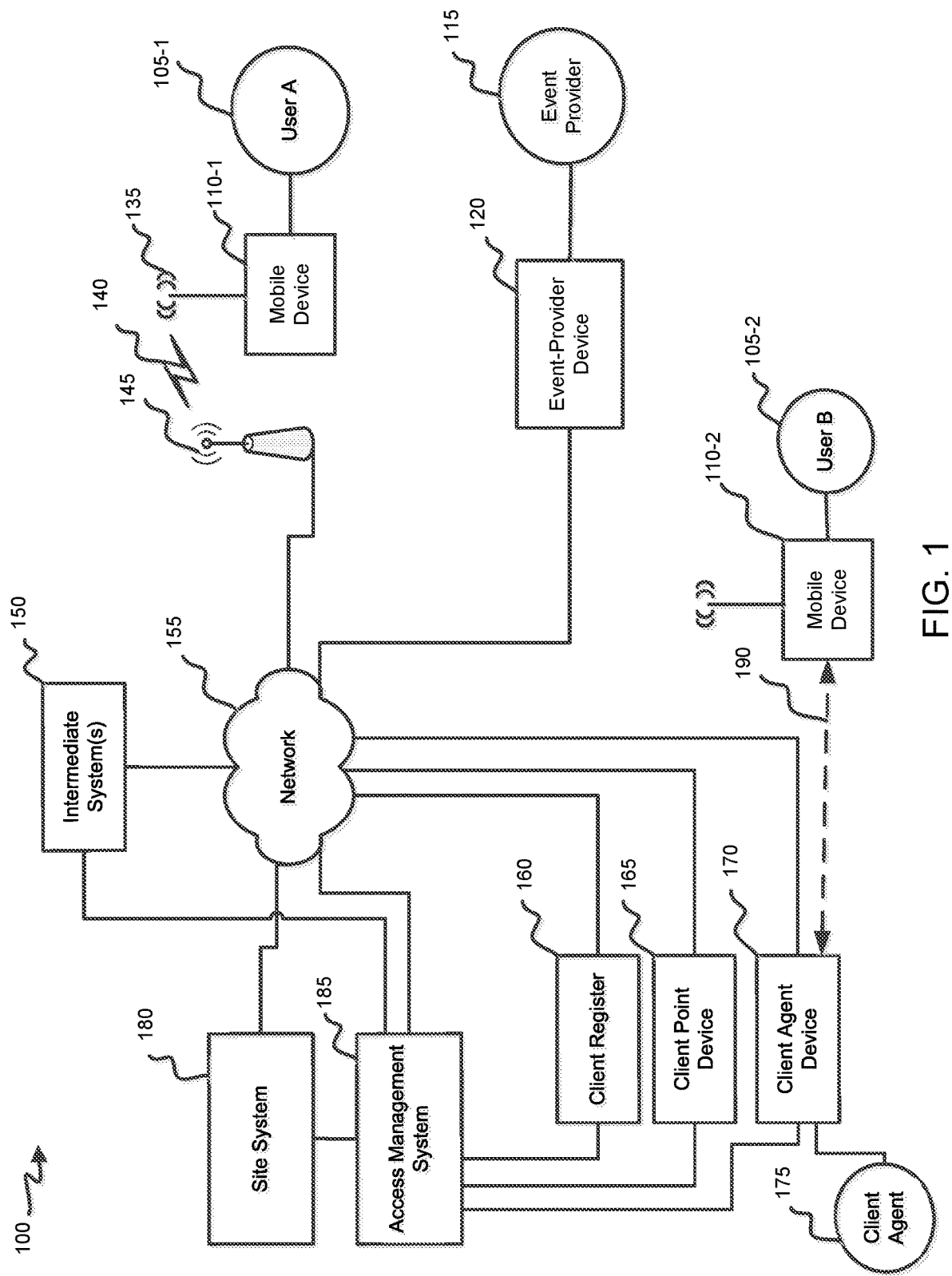
FIG. 1 depicts a block diagram of an embodiment of a resource access-facilitating interaction system.

Certain aspects and features of the present disclosure relate to systems and methods that execute machine-learning or AI techniques to generate predictions of optimal value components of reassignment value conditions of assigned access rights that are available to be reassigned to other users. Further, certain embodiments of the present disclosure relate to systems and methods that provide a value determination system configured to automatically determine (e.g., in some cases, based on a machine-learning prediction) the one or more value components of a reassignment value condition of an assigned access right requested for reassignment to another user. In some implementations, the value determination system may generate a contextual machine-learning model (e.g., a contextual multi-armed bandit model) that can be used to intelligently select a value for a value component of the reassignment value condition of an assigned access right that is subject to reassignment to other users. As an illustrative example, the contextual machine-learning model may process a context vector associated with the access-right requestor to generate an output predictive of a value component of a reassignment value condition. The reassignment value condition may be generated by the secondary load management system. The prediction of the value component may be performed in an intelligent manner that is based on contextual information of the user requesting reassignment of the assigned access right (e.g., the user requesting that an assigned access right be reassigned to the user). Further, a reinforcement learner may be implemented to explore different values for the value component(s) with a given probability to continuously predict optimal value components of the reassignment value condition.

More specifically, in some implementations, the value determination system may execute a contextual bandit learner and a reinforcement learner (e.g., an exploration strategy or rule) to continuously select a value component of the reassignment value condition with probability P, and to randomly explore a set of different values for the value component with probability 1-P. In some implementations, the value determination system can include a feedback loop configured to receive feedback signals from users who have satisfied the reassignment value condition and successfully completed the reassignment process (e.g., users to which assigned access rights have been reassigned). The value determination system may be configured to reevaluate both the value of a value component and the probabilities (e.g., P) of selecting those values for the value component of the reassignment value condition.

Certain embodiments of the present disclosure relate to a value determination system that executes a contextual machine-learning model to generate outputs predictive of the optimal value for a value condition of the reassignment value condition for an assigned access right available for reassignment using the secondary load management system. The value determination system can automatically select a value for a value component based on a number of users who have satisfied a reassignment value condition, which included a particular value of a particular value component. For example, the value determination system can automatically adapt to increase a target objective (e.g., total revenue) based on the data collected from some or all assignments of access rights performed by the primary load management system and/or some or all reassignments of assigned access rights performed by the secondary load management system. The value determination system can collect attributes of previous access right assignments performed by the primary load management system and/or real-time feedback signals from users who completed reassignments of assigned access rights. The collected attributes may be stored in one or more data sets used to train the contextual machine-learning model.

In some implementations, contextual multi-armed bandit learning techniques may be executed to generate outputs predictive of the value of one or more value components of a reassignment value condition. For example, the contextual multi-armed bandit learner may be used as part of the value determination system to generate a contextual machine-learning model. The contextual machine-learning model may include a constraint on values selectable for a value component of the reassignment value condition. The constraint may be determined based on the real-time data collected from users requesting or completing reassignments of assigned access rights using the secondary load management system. In some implementations, the value determination system can execute an exploration protocol (e.g., a reinforcement learning technique) to explore different values for a value component of the reassignment value condition of an assigned access right available for reassignment. The exploration of different values may test whether the explored values perform above a threshold associated with the target objective. In some implementations, the set of values used with the exploration protocol may be automatically modified based on the performance of explored values selected as value conditions of the reassignment value condition.

Advantageously, contextual bandit learners enable real-time collection of attributes from access-right assignments (performed by the primary load management system) and access-right reassignments (performed by the secondary load management system) to automatically update the various contextual machine-learning models. The contextual machine-learning model generated by the contextual bandit learner (along with the exploration protocol or rule described herein) can be used to predict values to select for a value component of the reassignment value condition. Without contextual learning, the time needed to collect a data set from access-right assignments or access-right reassignments to extract patterns is excessively long. Further, by the time patterns are extracted from the collected data set, the patterns may no longer be valid. Accordingly, generating an optimal value for a value component of a reassignment value condition is significantly technically challenging (and potentially impossible to achieve in a technical manner). Certain embodiments described herein enhance the value prediction of components of the reassignment value condition in a computationally efficient manner. Additionally, in some cases, a new user (e.g., a user without any previous interactions with the secondary load management system) may access the reassignment platform of the secondary load management system to request reassignment of assigned access rights to resources. The secondary load management system would not have stored a data set characterizing the new user, given the absence of previous interactions. As such, without the implementations described herein, accurately predicting the value of a value component of the reassignment value condition for the new user is also largely impossible or would be largely inaccurate. In the case of a new user, for example, the contextual machine-learning model may generate or process user vectors characterizing similar users or similar events based on previously reassignment access rights associated with the similar users. For example, the value determination system may execute one or more nearest neighbor techniques to identify users who are similar to the new user. The value prediction may be performed based, at least in part, on the attributes associated with the similar users and their previous interactions with the primary load management system or the secondary load management system.

According to certain embodiments described herein, the contextual learner may execute an exploration protocol to enable the value determination system to extract a set of features that represents the resource and/or the user requesting reassignment from the data set collected by the primary load management system (or potentially collected by the secondary load management system). For example, the value determination system can be configured (dynamically or based on user input) to select values for a value condition with a certain probability from a set of candidate values. Based on the feedback signals received from real-time reassignment requests using the secondary load management system, the value determination system can adjust the distribution of values to a different probabilistic allocation.

In some implementations, the feedback signal received from each completed reassignment request performed by the secondary load management system can include data representing various attributes of the reassignment. For example, the feedback signal can include at least the value used for some, any, or all of the value components of the reassignment value condition that was satisfied by the user and/or an identifier that uniquely identifies the user who completed the reassignment process for an assigned access right. The present disclosure is not limited thereto, and thus, it will be appreciated that any data about any aspect or attribute of the reassignment process can be included in the feedback signal. In some implementations, the feedback signal may be automatically transmitted to the value determination system at, upon, or substantially near in time (e.g., seconds, minutes, or hours) to the moment that a user completes the reassignment process (and thus, the assigned access right is reassigned to the user) using the secondary load management system. For example, the feedback signal can be sent from the secondary load management system to the value determination system at any time while a user is navigating the various interfaces of the reassignment platform. It will be appreciated that the feedback signal can be generated and transmitted to the value determination system at, upon, or substantially close in time to the moment the user transmits an indication to initiate the reassignment process (e.g., adds a particular access right to an online cart).

In some implementations, the value determination system can be configured to receive inputs, such as attributes that represent the reassignment value conditions that users have satisfied when completing the reassignment process for assigned access rights. The value determination system can then process resource or user features using the contextual machine-learning model for generating output predicting a value for one or more value components of the reassignment value condition. In some implementations, the value determination system can receive inputs, such as access-right data (e.g., data representing the total number of available access rights to a resource, a number of remaining available access rights to the resource, and the like), pixel information (e.g., data generated by a pixel tracker included on a webpage, and the like), and/or user identification information (e.g., a user identifier, such as a username, a user's email address or phone number, and the like). In some implementations, the contextual multi-armed bandit learner of the value determination system can build a context of the resource (e.g., date of duration of enabled access to the resource, location of resource, and other suitable characteristics of the resource). The contextual multi-armed bandit learner can also receive feedback signals representing completed reassignment requests. In some implementations, the value determination system can receive several inputs including an action (e.g., a selection of a value for a component of the reassignment value condition), the probability of that action (e.g., the probability P of selecting the particular value, and the feedback the value determination system received after a reassignment request was completed. The value determination system can generate a contextual machine-learning model that represents contextual information of the user or contextual information of the access right or resource for which the user seeks reassignment. The data ingested by the contextual machine-learning models can be processed by the contextual bandit learner in real-time to generate the value prediction. Non-limiting examples of the inputs, user features, or resource features that may serve as the basis of a context vector inputted into the contextual machine-learning model may include user identifier, data from a user's profile, user preferences, attributes of previous interactions between the user and the primary or secondary load management system, such as reassignment value conditions satisfied, and other similar features.

It will be appreciated that the value determination system can be configured to generate value predictions associated with one or more target objectives. It will also be appreciated that the value determination system can be used in determining whether users are human users or bot users. For example, users who access the secondary load management system can be ranked according to certain features. Then, the value determination system can cluster users into one of any number of clusters (based on a clustering operation, such as k-means clustering or any other suitable clustering technique), such as a bot cluster, a prioritized user cluster, a potential bot user, and so on. The value determination system can generate the contextual information for the user and/or for the particular resource being requested by the user, and then associate users with a cluster from amongst multiple clusters, based on the result of processing a user vector using the contextual machine-learning model. Each cluster can be associated with certain actions, for example, a first cluster of users can be authorized to request access to a subset of a set of available access rights.

In some implementations, based on the generated contextual information of the user and/or the generated contextual information of the resource or access right to the resource, the value determination system can generate a prediction of a value to use as a value component of a reassignment value condition for an assigned access right available for reassignment. In some implementations, the exploration protocol can be configured to explore values from a set of predefined values. Selecting values from a predefined set of values constrains the exploration protocol from exploring values that are above or below a threshold value. In some implementations, the set of values from which the current state value and the exploratory state value is selected can be user defined. In some implementations, the set of values from which the current state value and the exploratory state value is selected can be automatically learned from previously reassigned access rights.

In some implementations, the value determination system can update the contextual machine-learning model on a per access-right basis in real time. For example, the contextual machine-learning model may include a vector of data representing attributes of users who request access rights to resource associated with an entity. In some implementations, the exploration protocol executed by the value determination system may include an epsilon greedy selection technique, however, the present disclosure is not limited thereto.

In some implementations, the value determination system can ingest (e.g., receive and process) data that is used to train the one or more contextual machine-learning models. Ingesting data at the value determination system may include receiving resource and/or user features (e.g., any information that characterizes the user, access right, or resource). In some implementations, the data ingested into the value determination system may include, for example, a user profile or user features associated with a particular user who has initiated the process of requesting reassignment of an assigned access right (e.g., by generating queries for databases of assigned access rights available for reassignment), but who has not yet completed the reassignment process. Because the value determination system generates value predictions for value components of a reassignment value condition of an assigned access right for each individual user who requests reassignment, the value determination system may be configured to ingest data that represents the particular user. User features (e.g., data that represents or characterizes the particular user) that are detected or received at the value determination system may include any data that is associated with a particular user, any data that characterizes a user or a user's interactions with one or more systems, any data representing or characterizing historical interactions between the user and the primary or secondary load management system, any data from third-party data sources, and/or other suitable data or data sources that at least in some manner characterize an aspect of the user or a group of users. Non-limiting examples of user features that are received at the value determination system may include any data representing one or more of the user's previous access right requests, reassignment requests, data detected from a tracking pixel stored on a browser currently or previously operated by the user, an indication of social media networks associated with a username of the user (e.g., from third-party data sources), and other suitable data. The value determination system may also ingest (in addition to the user features or potentially in lieu of the user features) data representing resource features to generate the one or more contextual models. Non-limiting examples of resource features may include assignment value conditions for access rights to the resource, reassignment value conditions for assigned access rights to the resource that are now available for reassignment, attributes that characterize an entity associated with a particular resource, the locational region of the particular resource, the locational region associated with resources similar to the particular resource, and other suitable data. Together, the user features and the resource features ingested by the value determination system may be processed using one or more machine-learning and/or artificial intelligence techniques (e.g., contextual multi-armed bandit) to generate one or more contextual machine-learning models that can be used to predict values for value components of the reassignment value condition for any individual request for reassignment of an assigned access right.

Because the value determination system can ingest and process user features and/or resource features, the predicted value for a value component for the same assigned access right may be different between a first user and a second user who are in the process of requesting reassignment. In some implementations, if two different users (e.g., a first user and a second user) query for and then initiate the process for requesting reassignment of assigned access rights to the same resource, the value determination system may generate different value predictions for the two users. For example, the value determination system may receive or otherwise access a first user feature set associated with the first user to predict a first value of a value component of the reassignment value condition. Similarly, the value determination system may also receive a second user features set associated with the second user to predict a second value of the value component of the reassignment value condition. The assigned access rights reassigned to the first and second users may be for the same resource, but the value determination system may generate different value predictions for the users because potentially the user feature sets are different between the first user and the second user. Different user features sets may cause the contextual information inputted into the contextual machine-learning model to be different, and thus, different value predictions may be generated for each of the two users. The resource feature set may or may not be the same in both instances. While in the examples described above, the contextual machine-learning model generated by the value determination system may process the users' contextual information (e.g., the user feature set for each user) and/or the resource contextual information (e.g., the resource feature set), it will be appreciated that any contextual information may be generated and inputted into the contextual machine-learning model (e.g., weather data may be ingested to generate a weather feature set as part of the contextual machine-learning model).

In some implementations, the user contextual information, resource contextual information, or any other contextual information (e.g., weather context), may be a data vector (e.g., a map of values). As a non-limiting example, when a user accesses the secondary load management system, the user can search for assigned access rights available for reassignment using various interfaces provided by the secondary load management system. Once the user finds a suitable assigned access right to request for reassignment, the user generate in indication of the user's instruction to initiate the reassignment process for the assigned access right, and at that moment (or substantially at the same time), the value determination system generates a context vector for that particular user. For example, the context vector may be represented by a map of values (e.g., data field identifier of value, then value for that data field identifier, such as the entity associated with the resource). In some implementations, the context vector for a particular user may be a list of data field identifier and data field value pairs, however, the present disclosure is not limited thereto. The context vector then is passed into the contextual machine-learning model of the value determination system, and then the context vector is processed in the particular state at the time the context vector is passed to the contextual machine-learning model. A result or output of processing or evaluating the context vector by the contextual machine-learning model may be a predicted value for a value component of the reassignment value condition of that assigned access right that is the subject of the request for reassignment. As described above, the contextual machine-learning model is generated by the value determination system by executing one or more machine-learning and/or AI algorithms using historical data from previous access-right assignment or reassignment requests performed by the primary or secondary load management systems. Once the contextual machine-learning model is generated, then any new context vector that is processed or evaluated by the contextual machine-learning model result in a predicted value that is used as a value component of a reassignment value condition. If the particular user completes the reassignment process (and thus, the assigned access right is then reassigned to the particular user), then a feedback signal is sent to the value determination system, thereby reinforcing the contextual machine-learning model to bias similar users towards that particular value of the value component in light of the context vector generated for that particular user. If the particular user does not complete the reassignment process (e.g., the user exited the reassignment workflow), then a feedback signal is transmitted to the value determination system, thereby reinforcing the contextual model to bias similar users away from that particular value of the value component.

Advantageously, even if the context vector for a particular user is thin (e.g., does not include a sufficient amount of data because the user is a new user to the secondary load management system), the value determination system can solve this "this data" problem by generating value predictions based on feature sets of other similar users or feature sets of other similar resources. For instance, the value determination system can identify information from other similar resources and/or other similar users to generate the context vector that is passed into the contextual machine-learning model to generate the value prediction.

It will be appreciated that the value determination system is not limited to generating predictions of a value to use as a value component of a reassignment value condition determined by the secondary load management system. In some implementations, the value determination system can be used for bot detection purposes, as described above. Certain embodiments may relate to a clustering protocol for bot mitigation using the techniques described herein. As a non-limiting example, the bot detection system may create three clusters for classifying users stored in a digital queue awaiting processing of an assignment request. Each cluster may correspond to a classifier that can be associated with or tagged onto one or more users in the digital queue. A first cluster may be associated with valid human users, a second cluster may be associated with potential bot users, and a third cluster may be associated with determined bot users. The value determination system can predict which cluster to associate with a particular user based on the context vector of that particular user and the context vector associated with that cluster. The action that the value determination system can perform for an individual user is determining to which cluster that user is associated. For example, for new users not be associated with any historical data (e.g., a new user), the value determination system can generate a context vector for that user (based on the available data for that new user, such as email address) to predict to which cluster the new user should be associated. In doing so, the value determination system may compare the context vector against the context vectors of other similar users that previously requested assignment of access rights to a resource. Further, based on the evaluation of the context vector by the contextual machine-learning model, the value determination system can determine to which cluster other similar users were associated with in the past. In some implementations, a result or output of evaluating the context vector using the contextual machine-learning model may be a parameter that is used to prioritize the user, and the users can be stored in the digital queue according to their corresponding parameter. It will also be appreciated that the value determination system may generate value predictions for value components of an assignment value condition determined by the primary load management system.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale.

FIG. 1 depicts a block diagram of an embodiment of a resource management system 100, according to an embodiment of the present disclosure. Mobile device 110 (which can be operated by a user 105) and an event-provider device 120 (which can be operated, controlled, or used by an event provider 115) can communicate with an access management system 185 directly or via another system (e.g., via an intermediate system 150). Mobile device 110 may transmit data to access point 145, which is connected to network 155, over communication channel 140 using antennae 135. While FIG. 1 illustrates mobile device 110 communicating with access point 145 using a wireless connection (e.g., communication channel 140), in some embodiments, mobile device 110 may also communicate with access point 145 using a wired connection (e.g., an Ethernet connection). Mobile device 110 can also communicate with one or more client devices, such as a client agent device 170 operated by a client agent 175, a client register 160 or a client point device 165 using a wired or wireless connection. In addition, using the access management system 185, an event provider 115 can identify an event, a parameter of attending the event, a date or dates of the event, a location or locations of the event, etc. Each inter-system communication can occur over one or more networks 155 and can facilitate transmission of a variety of types of data. It will be understood that, although only one of various systems, devices, entities and network are shown, the resource management system 100 can be extended to include multiple of any given system(s), device(s), entity(ies), and/or networks.

Access management system 185 can be configured to manage a dynamic set of access rights to one or more resources. More specifically, access management system 185 can track which resources are to be made available to users, specifications of the resources and times at which they will be available. Access management system 185 can also allocate access rights for resources and facilitate transmissions of notifications of the available rights to a set of user devices. For example, access management system 185 can alert users of the availability via a website, app page or email. As another example, access management system can transmit data about access rights and resources to one or more intermediate systems 150, which can facilitate distribution of access-right availability and processing of requests for such rights.

Notifications of available access rights can be accompanied by options to request that one or more access rights be assigned to a user. Therefore, user 105 can provide input to mobile device 110 via an interface to request such assignment and provide other pertinent information. Intermediate system 150 and/or access management system 185 can process the request to ensure that the requested access right(s) remain available and that all required information has been received and, in some instances, verified. Thereafter, access management system 185 can assign one or more access rights to the user, e.g., matching the access rights requested by the user.

Assigning an access right can include, for example, associating an identifier of the right with an identifier of a user, changing a status of the right from available to assigned, facilitating a cease in notifications that the access right is available, generating an access-enabling code to use such that the corresponding access will be permitted and/or generating a notification to be received at mobile device 110 confirming the assignment and/or including data required for corresponding access to be permitted.

In some instances, a resource is at least partly controlled, by a client. The resource may be accessed at a particular location or structure, and a variety of client devices may be present at the location so as to facilitate usage of an access right. Exemplary client devices can include client agent device 170, which can be one operated by a client agent 175 (e.g., a human client agent), a client register 160 (e.g., which can operate independently of an agent and/or can be connected to or include a device that, while in a locked mode, can impede resource access, such as a turnstile) and client point device 165 (e.g., which can operate independently of an agent and/or can be positioned at or around the resource-associated location. For example, in some instances client agent device 170 can be operated by an agent at a location for a resource that is an event ("event resource") taking place at the location. In this example, client agent device 170 is used by an agent that is manning an entrance to the location (e.g., which can include, for example, a location of a structure or a geographic region) or a part thereof; client register 160 can be or can be connected to a turnstile, gate or lockable door that is positioned along a perimeter or entrance to a resource-associated location or part thereof; and client point device 165 can be an electronic device positioned at or within a resource-associated location.

In some instances, mobile device 110 performs particular functions upon detecting a client device and/or the contrary. For example, mobile device 110 may locally retrieve or request (e.g., from an external source) an access-enabling code. The access-enabling code can be transmitted to the client device or a remote server (e.g., a server hosting access management system 185) for evaluation and/or can be locally evaluated. The evaluation can include, for example, confirming that the access-enabling code has a particular characteristic or format (e.g., generally or one characteristic corresponding to a particular resource or type of access), matches one in an access-enabling code data store and/or has not been previously redeemed. A result of the evaluation can be locally displayed at an evaluating device, can control a device component (e.g., a physical access control module), and/or can be transmitted to another device, such as mobile device 110.

In some instances, user 105 can use multiple mobile devices 110 to perform various operations (e.g., using one device to request an access right and another to interact with client devices). Some instances of mobile device 110, access management system 185, intermediate system 150, client agent device 170, client register 160 and/or client point device 165 can include a portable electronic device (e.g., a smart phone, tablet, laptop computer or smart wearable device) or a non-portable electronic device (e.g., one or more desktop computers, servers and/or processors).

In exemplary embodiments, access rights can be represented in data maintained at a client device or at access management system 185. For example, a database or data store include a list of identifiers for each user or user device having an assigned access right for a resource or associating an identifier for each user or user device with an identifier of a particular access right. In some instances, indicia can be transmitted to a user device that indicates that an access right is availed. In various instances, it may be permitted or prohibited for the indicia to be transferred. The indicia may be provided as part of an electronic or physical object (e.g., a right to access an event) or independently. The indicia may include an access-enabling code.

In some instances, access management system 185 communicates with one or more intermediate systems 150, each of which may be controlled by a different entity as compared to an entity controlling access management system 185. For example, access management system 185 may assign access rights to intermediate systems 150 (e.g., upon acceptance of terms). Intermediate system 150 can then collect data pertaining to the assigned access rights and/or a corresponding event, can format and/or edit the data, generate a notification of availability of the access rights that includes the formatted and/or edited data and facilitate presentation of the notification at a mobile device 110. When intermediate system 150 receives a communication from the mobile device 110 indicative of an access-right request, intermediate system 150 can facilitate assignment (or reassignment) of an access right to the user (e.g., by transmitting relevant information to access management system 185 identifying the user and/or user device and/or by transmitting relevant information to mobile device 110 pertaining to the access right).

A resource can include one managed or provided by a client, such as an entity or an entity operating a spatial region. A mobile device 110 can transmit data corresponding to the access right (e.g., an access-enabling code) to a client device upon, for example, detecting the client device, detecting that a location of the mobile device 110 is within a prescribed geographical region, or detecting particular input. The receiving client device may include, for example, a client agent device 170 operated at an entrance of a defined geographical location or a client register 160 that includes or is attached to a locking turnstile. The client device can then analyze the code to confirm its validity and applicability for a particular resource and/or access type, and admittance to the event can be accordingly permitted. For example, a turnstile may change from a locked to an unlocked mode upon confirmation of the code's validity and applicability.

Each of the depicted devices and/or systems may include a software agent or application ("app") that, when executed, performs one or more actions as described herein. In some instances, a software agent or app on one device is, at least in part, complementary to a software agent or app on another device (e.g., such that a software agent or app on mobile device 110 is, at least in part, complementary to at least part of one on access management system 185 and/or a client device; and/or such that a software agent or app on intermediate system 150 is, at least in part, complementary to at least part of one on access management system 185).

In some instances, a network in the one or more networks 155 can include an open network, such as the Internet, personal area network, local area network (LAN), campus area network (CAN), metropolitan area network (MAN), wide area network (WAN), wireless local area network (WLAN), a private network, such as an intranet, extranet, or other backbone. In some instances, a network in the one or more networks 155 includes a short-range communication channel, such as Bluetooth or Bluetooth Low Energy channel. Communicating using a short-range communication such as BLE channel can provide advantages such as consuming less power, being able to communicate across moderate distances, being able to detect levels of proximity, achieving high-level security based on encryption and short ranges, and not requiring pairing for inter-device communications.

In one embodiment, communications between two or more systems and/or devices can be achieved by a secure communications protocol, such as secure sockets layer (SSL), transport layer security (TLS). In addition, data and/or transactional details may be encrypted based on any convenient, known, or to be developed manner, such as, but not limited to, DES, Triple DES, RSA, Blowfish, Advanced Encryption Standard (AES), CAST-128, CAST-256, Decorrelated Fast Cipher (DFC), Tiny Encryption Algorithm (TEA), eXtended TEA (XTEA), Corrected Block TEA (XX-TEA), and/or RCS, etc.

It will be appreciated that, while a variety of devices and systems are shown in FIG. 1, in some instances, resource management system 100 can include fewer devices and/or systems. Further, some systems and/or devices can be combined. For example, a client agent device 170 may also serve as an access management system 185 or intermediate system 150 so as to as to facilitate assignment of access rights.

As described in further detail herein, an interaction between mobile device 110 and a client device (e.g., client agent device 170, client register 160 or client point device 165) can facilitate, for example, verification that user 105 has a valid and applicable access right, obtaining an assignment of an access right, and/or obtaining an assignment of an upgraded access right.

In addition, mobile device 110-2, which is operated by user 125-2, may include a user device that is located at a spatial region of the resource (e.g., venue) during a time period for which the resource is accessible (e.g., event time). Mobile device 110-2 may directly interact with a client device (e.g., client agent device 170, client register 160 or client point device 165), which is also located at the spatial region during the time period in which the resource is accessible using access rights. As such, the access management system 185 may be updated or accessed by mobile device 110-2 via the client agent device 170. For example, mobile device 110-2 may communicate with the client agent device 170 over a short-range communication channel 190, such as Bluetooth or Bluetooth Low Energy channel, Near Field Communication (NFC), Wi-Fi, RFID, Zigbee, ANT, etc. Communicating using a short-range communication such as BLE channel can provide advantages such as consuming less power, being able to communicate across moderate distances, being able to detect levels of proximity, achieving high-level security based on encryption and short ranges, and not requiring pairing for inter-device communications. After the short-range communication link 190 is established, mobile device 110-2 may communicate with the access management system 185 and access the item or items of resources. That is, while mobile device B is configured to communicate over network 155, mobile device 110-2 may communicate with the access management system 185 via the client agent device 170, instead of the network 155.

It will be appreciated that various parts of system 100 can be geographically separated. It will further be appreciated that system 100 can include a different number of various components rather than a number depicted in FIG. 1. For example, two or more of access assignment systems 185; one or more site systems 180; and intermediate system 150 may be located in different geographic locations (e.g., different cities, states or countries).

Figure 2:
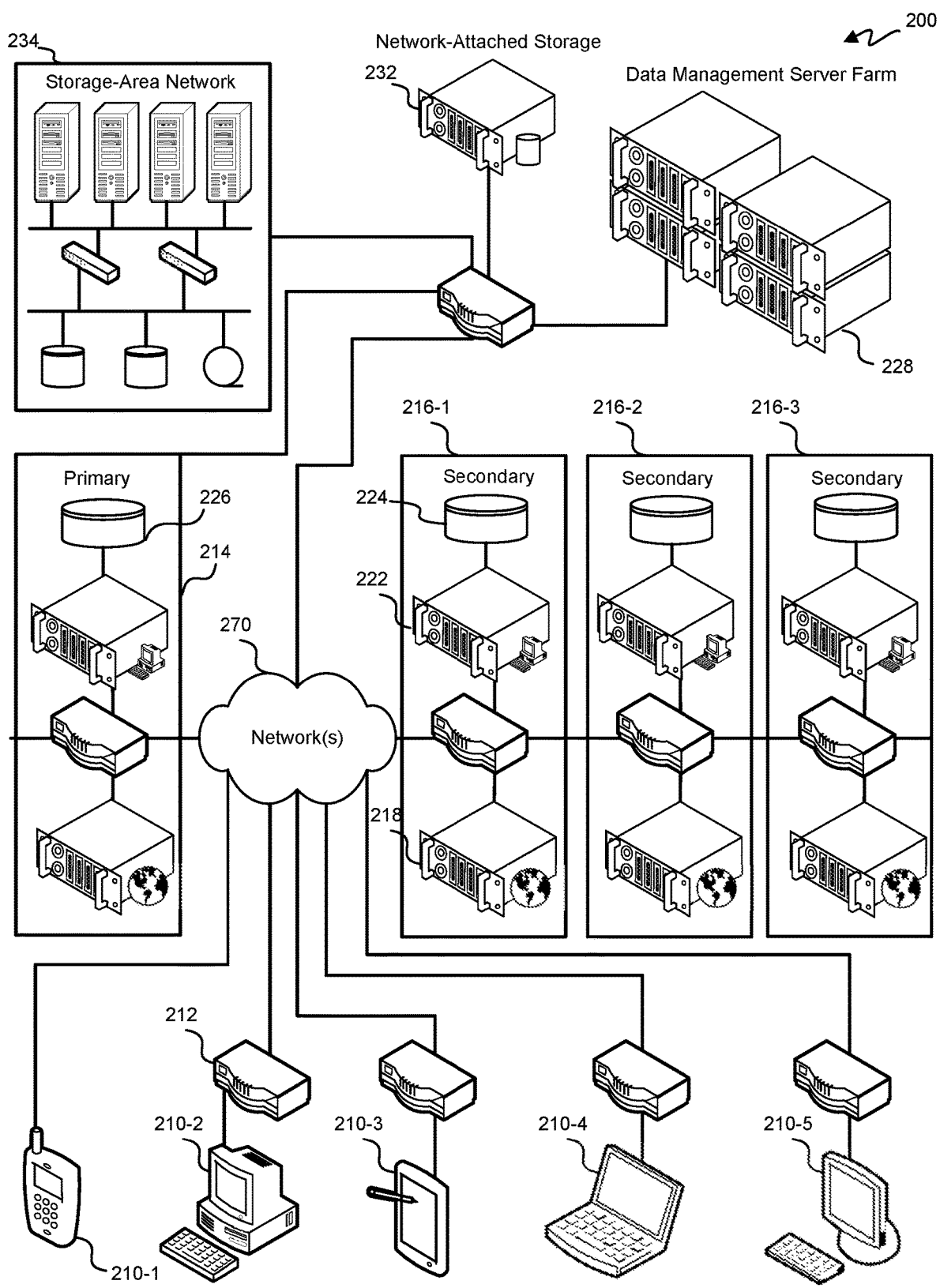
FIG. 2 shows an illustration of hardware and network connections of a resource access-facilitating interaction system according to an embodiment of the invention.

FIG. 2 shows an illustration of hardware and network connections of a resource access-facilitating interaction system 200 according to an embodiment of the invention. Each of various user devices 210-1, 210-2, 210-3, 210-4 and 210-5 can connect, via one or more inter-network connection components (e.g., a router 212) and one or more networks 270 to a primary assignment management system 214 or a secondary assignment management system 216-1, 216-2 or 216-3.

Primary assignment management system 214 can be configured to coordinate and/or control initial assignment of access rights. Secondary assignment management system 216 can be configured to coordinate and/or control reassignment and/or transfer of access rights (e.g., from one user or user device to another or from an intermediate agent to a user or user device). Secondary assignment management system 216 may also manage transfer offers (e.g., to allow a first user to identify a value at which a transfer request would be granted and to detect if a valid request is received). It will be appreciated that, although primary assignment management system 214 is shown to be separate from each secondary assignment management system 216, in some instances, an assignment management system may relate to both a primary and secondary channel, and a single data store or a localized cluster of data stores may include data from both channels.

Each of primary access assignment system 214 and secondary access assignment system 216 can include a web server 218 that processes and responds to HTTP requests. Web server 218 can retrieve and deliver web-page data to a user device 210 that, for example, identify a resource, identify a characteristic of each of one or more access rights for the resource, include an invitation to request assignment of an access right, facilitate establishment or updating of a profile, and/or identify characteristics of one or more assigned access rights. Web server 218 can be configured to support server-side scripting and/or receive data from user devices 210, such as data from forms or file uploads.

In some instances, a web server 218 can be configured to communicate data about a resource and an indication that access rights for the resource are available. Web server 218 can receive a request communication from a user device 210 that corresponds to a request for information about access rights. The request can include one or more constraints, which can correspond to (for example) values (e.g., to be matched or to define a range) of particular fields.

A management server 222 can interact with web server 218 to provide indications as to which access rights' are available for assignment, characteristics of access rights and/or what data is needed to assign an access right. When requisite information is received (e.g., about a user and/or user device, identifying a final request for one or more access rights, including payment information, and so on), management server 222 can coordinate an assignment of the one or more access rights. The coordination can include updating an access-right data store to change a status of the one or more access rights (e.g., to assigned); to associate each of the one or more access rights with a user and/or user device; to generate or identify one or more access-enabling codes for the one or more access rights; and/or to facilitate transmission reflecting the assignment (e.g., and including the one or more access-enabling codes) to a user device.

Management server 222 can query, update and manage an access-right data store to identify access rights' availability and/or characteristic and/or to reflect a new assignment. The data store can include one associated with the particular assignment system. In some instances, the data store includes incomplete data about access rights for a resource. For example, a data store 224 at and/or used by a secondary access assignment system 216 may include data about an incomplete subset of access rights that have been allocated for a particular resource. To illustrate, a client agent may have indicated that an independent intermediary system can (exclusively or non-exclusively) coordinate assignment of a portion of access rights for a resource but not the remainder. A data store 224 may then, for example, selectively include information (e.g., characteristics, statuses and/or assignment associations) for access rights in the portion.

Data store 224 or 226 associated with a particular primary or secondary access assignment system can include assignment data for a set of access rights that are configured to be set by the particular primary or secondary access assignment system or by another system. For example, a rule can indicate that a given access right is to have an available status until a first of a plurality of access assignment systems assigns the access right. Accordingly, access assignment systems would then need to communicate to alert each other of assignments.

In one instance, management server 222 (or another server in an access assignment system) sends a communication to a central data management server farm 228 reflecting one or more recent assignments. The communication may include an identification of one or more access rights, an indication that the access right(s) have been assigned, an identification of a user and/or user device associated with the assignment and/or one or more access-enabling codes generated or identified to be associated with the assignment. The communication can be sent, for example, upon assigning the access right(s), as a precursor to assigning the access right(s) (e.g., to confirm availability and/or request assignment authorization), at defined times or time intervals and/or in response to an assignment-update request received from data management server farm 228.

Data management server farm 228 can then update a central data store to reflect the data from the communication. The central data store can be part of, for example, a network-attached storage 232 and/or a storage-area network 234.

In some instances, a data store 224 or 226 can include a cache, that includes data stored based on previous communications with data management server farm 228. For example, data management server farm 228 may periodically transmit statuses of a set of access rights (e.g., those initially configured to be assignable by an access assignment system) or an updated status (e.g., indicating an assignment) of one or more access rights. As another example, data management server farm 228 may transmit statuses upon receiving a request from an access assignment system for statuses and/or authorization to assign one or more access rights.

An access assignment system may receive statuses less frequently or at times unaligned with requests received from user devices requesting information about access rights and/or assignments. Rather than initiate a central data store query responsive to each user-device request, a management server 222 can rely on cached data (e.g., locally cached data) to identify availability of one or more access rights, as reflect in webpage data and/or communications responsive to request communications for access-right information. After requisite information has been obtained, management server 222 can then communicate with data management server farm 228 to ensure that one or more particular access rights have remained available for assignment.

In some instances, one or more of primary access assignment system 214 and/or a secondary access assignment system 214 need not include a local or system-inclusive data store for tracking access-right statuses, assignments and/or characteristics. Instead, the access assignment system may communicate with a remote and/or central data store (e.g., network-attached storage 232 or storage-area network 234).

Access management system 120 can include a primary access assignment system 214 and/or a secondary access assignment system 214; data management server farm 228; and/or a central data store (e.g., network-attached storage 232 or storage-area network 234). Each of one or more intermediate systems 130 can include a primary access assignment system 214 and/or a secondary access assignment system 214.

Data management server farm 228 may periodically and/or routinely assess a connection with an access assignment system 214. For example, a test communication can be sent that is indicative of a request to respond (e.g., with particular data or generally). If a response communication is not received, if a response communication is not received within a defined time period and/or if a response communication includes particular data (e.g., reflecting poor data integrity, network speed, processing speed, etc.), data management server farm 228 may reconfigure access rights and/or permissions and/or may transmit another communication indicating that assignment rights of the access assignment system are limited (e.g., to prevent the system from assigning access rights).

It will be appreciated that various parts of system 200 can be geographically separated. For example, two or more of primary access assignment system 214; one or more of secondary access assignment systems 214; and data management server farm 228 may be located in different geographic locations (e.g., different cities, states or countries).

It will further be appreciated that system 200 can include a different number of various components rather than a number depicted in FIG. 2. For example, system 200 can include multiple data management server farms 228, central data stores and/or primary access assignment systems 214 (e.g., which can be geographically separated, such as being located in different cities, states or countries). In some instances, processing may be split (e.g., according to a load-balancing technique) across multiple data management server farms 228 and/or across multiple access assignment systems 214. Meanwhile, the farms and/or systems can be configured to accept an increased or full load should another farm and/or system be unavailable (e.g., due to maintenance). Data stored in a central data store may also be replicated in geographically separated data stores.

Figure 3:
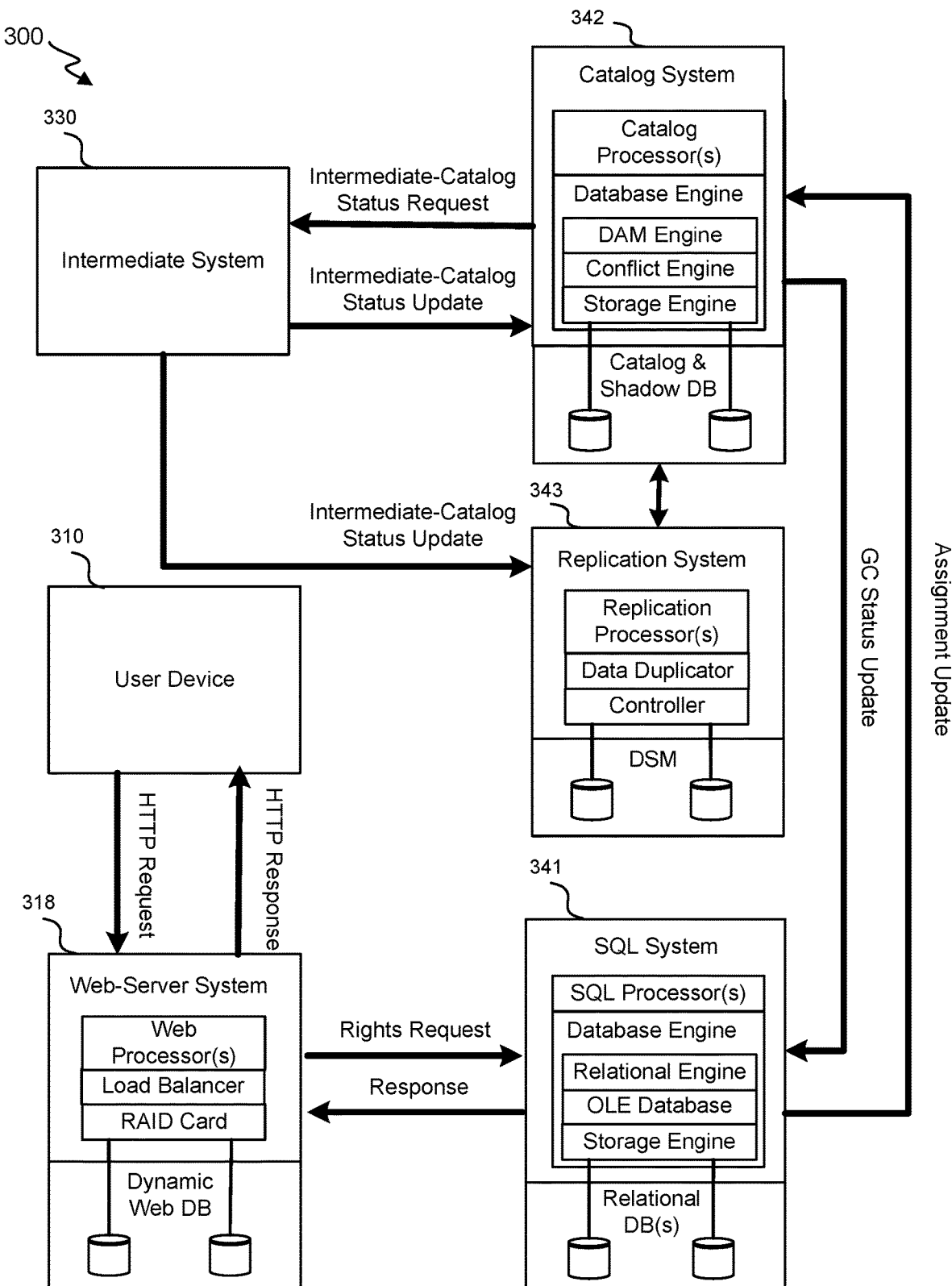
FIG. 3 shows an illustration of a communication exchange between components involved in a resource access-facilitating interaction system according to an embodiment of the invention.

FIG. 3 shows an illustration of a communication exchange between components involved in a resource access-facilitating interaction system 300 according to an embodiment of the invention. A user device 310 can send one or more HTTP requests to a web-server system 318, and web-server system 318 can respond with one or more HTTP responses that include webpage data. The webpage data can include, for example, information about one or more resources, characteristics of a set of access rights for each of the one or more resources, availability of one or more access rights, an invitation to request an assignment of one or more access rights and/or indications as to what information is required for an access-right assignment. HTTP requests can include assignment-request data (e.g., a resource identification, requisite information, and/or an identification of an access-right constraint or access right).

Web-server system 318 can include one or more web processors (e.g., included in one or more server farms, which may be geographically separated) to, for example, map a path component of a URL to web data (e.g., stored in a local file system or generated by a program); retrieve the web data; and/or generate a response communication including the web data. Web processor can further parse communication to identify input-corresponding data in HTTP requests, such as field values required for an access-right assignment.

Web-server system 318 can also include a load balancer to distribute processing tasks across multiple web processors. For example, HTTP requests can be distributed to different web processors. Load-balancing techniques can be configured so as, for example, to distribute processing across servers or server farms, decrease a number of hops between a web server and user device, decrease a geographical location between a user device and web server, etc.

Web-server system 318 can further include a RAID component, such as a RAID controller or card. A RAID component can be configured, for example, to stripe data across multiple drives, distribute parity across drives and/or mirror data across multiple drives. The RAID component can be configured to improve reliability and increase request-processing speeds.

Web-server system 318 can include one or more distributed, non-distributed, virtual, non-virtual, local and/or remote data stores. The data stores can include web data, scripts and/or content object (e.g., to be presented as part or web data).

Some HTTP requests include requests for identifications of access-right characteristics and/or availability. To provide web data reflecting such information, web-server system 318 can request the information from another server, such as an SQL system 341 (e.g., which may include one or more servers or one or more server farms).

SQL system 341 can include one or more SQL processors (e.g., included in one or more server farms, which may be geographically separated). SQL processors can be configured to query, update and otherwise use one or more relational data stores. SQL processors can be configured to execute (and, in some instances, generate) code (e.g., SQL code) to query a relational data store.

SQL system 341 can include a database engine, that includes a relational engine, OLE database and storage engine. A relational engine can process, parse, compile, and/or optimize a query and/or make query-associated calls. The relational engine can identify an OLE DB row set that identifies the row with columns matching search criteria and/or a ranking value. A storage engine can manage data access and use the rowset (e.g., to access tables and indices) to retrieve query-responsive data from one or more relational databases.

SQL system 341 can include one or more distributed, non-distributed, virtual, non-virtual, local and/or remote relational data stores. The relational databases can include linked data structures identifying, for example, resource information, access-right identifications and characteristics, access-right statuses and/or assignments, and/or user and/or user profile data. Thus, for example, use of the relational structures may facilitate identifying, for a particular user, a characteristic of an assigned access right and information about a resource associated with the access right.

One or more data structures in a relational data structure may reflect whether particular access rights have been assigned or remain available. This data may be based on data received from a catalog system 342 that monitors and tracks statuses of resource access rights. Catalog system 342 can include one or more catalog processors (e.g., included in one or more server farms, which may be geographically separated). Catalog processors can be configured to generate status-update request communications to be sent to one or more access assignment systems and/or intermediate systems and/or to receive status-update communications from one or more access assignment systems and/or intermediate systems. A status-update communication can, for example, identify an access right and/or resource and indicate an assignment of the access right. For example, a status-update communication can indicate that a particular access right has been assigned and is thus no longer available. In some instances, a status-update communication identifies assignment details, such as a user, profile and/or user device associated with an access-right assignment; a time that the assignment was made; and/or a price associated with the assignment.

In some instances, a status update is less explicit. For example, a communication may identify an access right and/or resource and request a final authorization of an assignment of the access right. Catalog system 342 can then verify that the access right is available for assignment (e.g., and that a request-associated system or entity is authorized to coordinate the assignment) and can transmit an affirmative response. Such a communication exchange can indicate (in some instances) that the access right is assigned and unavailable for other assignment.

In some instances, catalog system 342 can also be integrated with a non-intermediate access assignment system, such that it can directly detect assignments. For example, an integrated access assignment system can coordinate a message exchange with a user device, can query a catalog data store to identify available access rights and can facilitate or trigger a status-change of an access right to reflect an assignment (e.g., upon having received all required information).

Whether a result of a direct assignment detection or a status update from an intermediate system, a database engine of catalog system 342 can manage one or more data stores so as to indicate a current status of each of a set of access rights for a resource. The one or more data stores may further identify any assignment constraints. For example, particular access rights may be earmarked so as to only allow one or more particular intermediate systems to trigger a change to the access rights' status and/or to assign the access rights.

The database engine can include a digital asset management (DAM) engine to receive, transform (e.g., annotate, reformat, introduce a schema, etc.) status-update communications, and identify other data (e.g., an identifier of an assigning system and/or a time at which a communication was received) to associate with a status update (e.g., an assignment). Therefore, the DAM engine can be configured to prepare storage-update tasks so as to cause a maintained data store to reflect a recent data change.

Further, the DAM engine can facilitate handling of data-store queries. For example, a status-request communication or authorization-request communication can be processed to identify variables and/or indices to use to query a data store. A query can then be generated and/or directed to a data store based on the processing. The DAM engine can relay (e.g., and, potentially, perform intermediate processing to) a query result to a request-associate system.

The database engine can also include a conflict engine, which can be configured to access and implement rules indicating how conflicts are to be handled. For example, catalog system 342 may receive multiple requests within a time period requesting an assignment authorization (or a hold) for a particular access right. A rule may indicate that a first request is to receive priority, that a request associated with a more highly prioritized requesting system (e.g., intermediate system) is to be prioritized, that a request associated with a relatively high (or low) quantity of access rights identified in the request for potential assignment are to be prioritized, etc.

The database engine can further include a storage engine configured to manage data access and/or data updates (e.g., modifying existing data or adding new data). The data managed by and/or accessible to the storage engine can be included in one or more data stores. The data stores can include, for example, distributed, non-distributed, virtual, non-virtual, local and/or remote data stores. The data stores can include, for example, a relational, non-relational, object, non-object, document and/or non-document data store. Part or all of a data store can include a shadow data store, that shadows data from another data store. Part or all of a data store can include an authoritative data store that is (e.g., directly and/or immediately) updated with access-right assignment changes (e.g., such that a primary or secondary access assignment system updates the data store as part of an access-right assignment process, rather than sending a post-hoc status-update communication reflecting the assignment). In some instances, a data store an authoritative data store identifies a status for each of a set (e.g., or all) of access rights for a given resource. Should there be any inconsistency between an authoritative data store and another data store (e.g., at an intermediate system), system 300 can be configured such that the authoritative data store is controlling.

System 300 can further include a replication system 343. Replication system 343 can include one or more replication processors configured to identify new or modified data, to identify one or more data stores and/or location at which to store the new or modified data and/or to coordinate replication of the data. In some instances, one or more of these identifications and/or coordination can be performed using a replication rule. For example, a replication rule may indicate that replication is to be performed in a manner biased towards storing replicated data at a data store geographically separated from another data store storing the data.

A data duplicator can be configured to read stored data and generate one or more write commands so as to store the data at a different data store. A controller can manage transmitting write commands appropriately so as to facilitate storing replicated data at identified data stores. Further, a controller can manage data stores, such as a distributed memory or distributed shared memory, to ensure that a currently active set of data stores includes a target number of replications of data.

Accordingly, web-server system 318 can interact with user device 310 to identify available access rights and to collect information needed to assign an access right. Web-server system 318 can interact with SQL system 341 so as to retrieve data about particular resources and/or access rights so as to configure web data (e.g., via dynamic webpages or scripts) to reflect accurate or semi-accurate information and/or statuses. SQL system 341 can use relational data stores to quickly provide such data. Meanwhile, catalog system 342 may manage one or more non-relational and/or more comprehensive data stores may be tasked with more reliably and quickly tracking access-right statuses and assignments. The tracking may include receiving status updates (e.g., via a push or pull protocol) from one or more intermediate systems and/or by detecting assignment updates from non-intermediate systems, such as an integrated access assignment system and/or SQL system 341. Catalog system 342 may provide condensed status updates (e.g., reflecting a binary indication as to whether an access right is available) to SQL system 341 periodically, at triggered times and/or in response to a request from the SQL system. A replication system 343 can further ensure that data is replicated at multiple data stores, so as to improve a reliability and speed of system 300.

It will be appreciated that various parts of system 300 can be geographically separated. For example, each of user device 310, intermediate system 330, web-server system 318, SQL system 341, catalog system 342 and replication 343 may be located in different geographic locations (e.g., different cities, states or countries).

Figure 4:
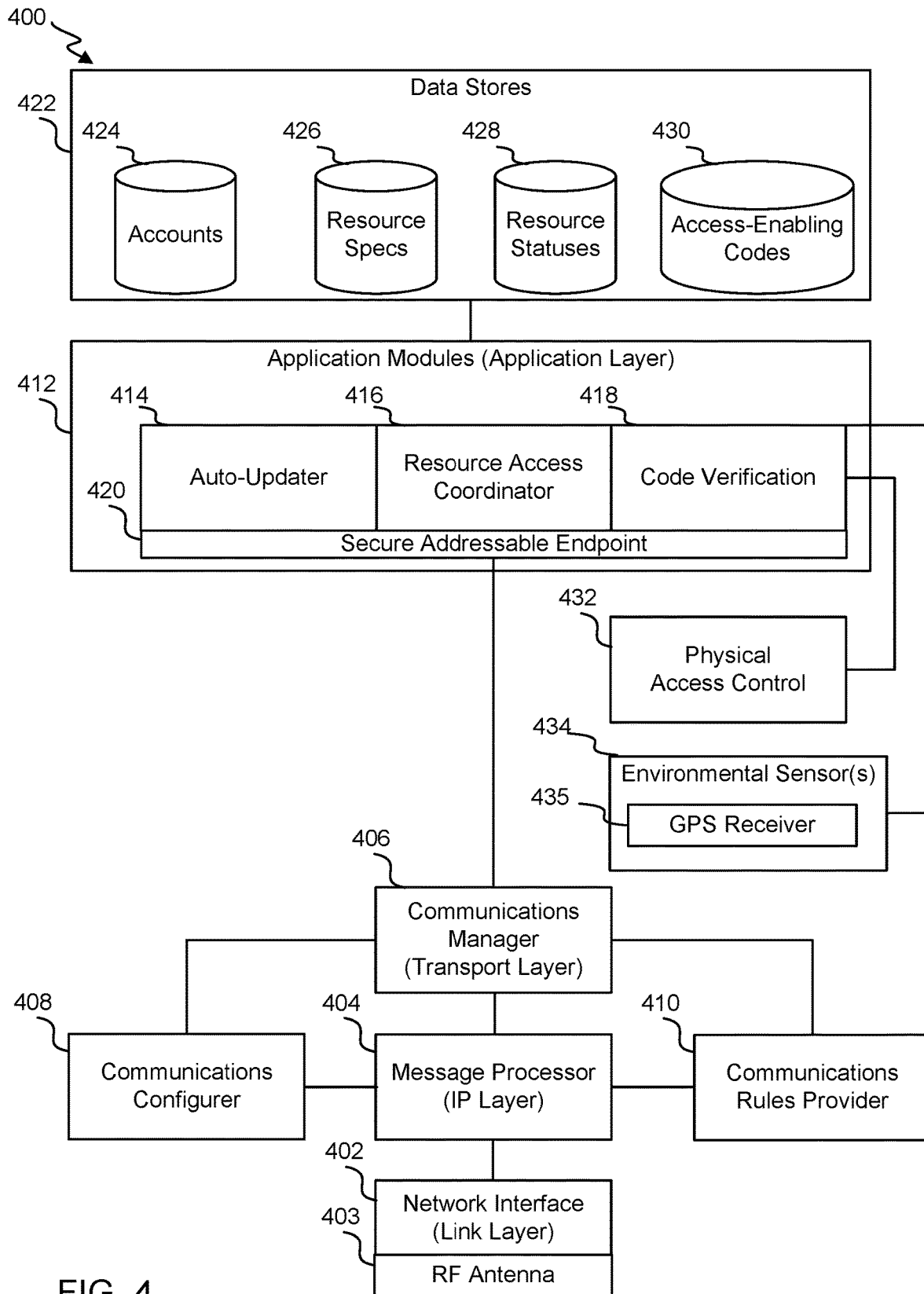
FIG. 4 illustrates example components of a device.

FIG. 4 illustrates example components of a device 400, such as a client device (e.g., client agent device 140, client register 150 and/or client point device 160), an intermediate system (e.g., intermediate system 130) and/or an access management system (e.g., access management system 120) according to an embodiment of the invention.

The components can include one or more modules that can be installed on device 400. Modules can include some or all of the following: a network interface module 402 (which can operate in a link layer of a protocol stack), a message processor module 404 (which can operate in an IP layer of a protocol stack), a communications manager module 406 (which can operate in a transport layer of a protocol stack), a communications configure module 408 (which can operate in a transport and/or IP layer in a protocol stack), a communications rules provider module 410 (which can operate in a transport and/or IP layer in a protocol stack), application modules 412 (which can operate in an application layer of a protocol stack), a physical access control module 432 and one or more environmental sensors 434.

Network interface module 402 receives and transmits messages via one or more hardware components that provide a link-layer interconnect. The hardware component(s) can include, for example, RF antenna 403 or a port (e.g., Ethernet port) and supporting circuitry. In some embodiments, network interface module 402 can be configured to support wireless communication, e.g., using Wi Fi (IEEE 802.11 family standards), Bluetooth® (a family of standards promulgated by Bluetooth SIG, Inc.), BLE, or near-field communication (implementing the ISO/IEC 18092 standards or the like).

RF antenna 403 can be configured to convert electric signals into radio and/or magnetic signals (e.g., to radio waves) to transmit to another device and/or to receive radio and/or magnetic signals and convert them to electric signals. RF antenna 403 can be tuned to operate within a particular frequency band. In some instances, a device includes multiple antennas, and the antennas can be, for example, physically separated. In some instances, antennas differ with respect to radiation patterns, polarizations, take-off angle gain and/or tuning bands. RF interface module 402 can include one or more phase shifters, filters, attenuators, amplifiers, switches and/or other components to demodulate received signals, coordinate signal transmission and/or facilitate high-quality signal transmission and receipt.

In some instances, network interface module 402 includes a virtual network interface, so as to enable the device to utilize an intermediate device for signal transmission or reception. For example, network interface module 402 can include VPN software.

Network interface module 402 and one or more antennas 403 can be configured to transmit and receive signals over one or more connection types. For example, network interface module 402 and one or more antennas 403 can be configured to transmit and receive WiFi signals, cellular signals, Bluetooth signals, Bluetooth Low Energy (BLE) signals, Zigbee signals, or Near-Field Communication (NFC) signals.

Message processor module 404 can coordinate communication with other electronic devices or systems, such as one or more servers or a user device. In one instance, message processor module 404 is able to communicate using a plurality of protocols (e.g., any known, future and/or convenient protocol such as, but not limited to, XML, SMS, MMS, and/or email, etc.). Message processor module 404 may further optionally serialize incoming and/or outgoing messages and facilitate queuing of incoming and outgoing message traffic.

Message processor module 404 can perform functions of an IP layer in a network protocol stack. For example, in some instances, message processor module 404 can format data packets or segments, combine data packet fragments, fragment data packets and/or identify destination applications and/or device addresses. For example, message processor module 404 can defragment and analyze an incoming message to determine whether it is to be forwarded to another device and, if so, can address and fragment the message before sending it to the network interface module 402 to be transmitted. As another example, message processor module 404 can defragment and analyze an incoming message to identify a destination application that is to receive the message and can then direct the message (e.g., via a transport layer) to the application.

Communications manager module 406 can implement transport-layer functions. For example, communications manager module 406 can identify a transport protocol for an outgoing message (e.g., transmission control protocol (TCP) or user diagram protocol (UDP)) and appropriately encapsulate the message into transport protocol data units. Message processor module 404 can initiate establishment of connections between devices, monitor transmissions failures, control data transmission rates and monitoring transmission quality. As another example, communications manager module 406 can read a header of an incoming message to identify an application layer protocol to receive the message's data. The data can be separated from the header and sent to the appropriate application. Message processor module 404 can also monitor the quality of incoming messages and/or detect out of order incoming packets.

In some instances, characteristics of message-receipt or message-transmission quality can be used to identify a health status of an established communications link. In some instances, communications manager module 406 can be configured to detect signals indicating the health status of an established communications link (e.g., a periodic signal from the other device system, which if received without dropouts, indicates a healthy link).

In some instances, a communication configurer module 408 is provided to track attributes of another system so as to facilitate establishment of a communication session. In one embodiment, communication configurer module 408 further ensures that inter-device communications are conducted in accordance with the identified communication attributes and/or rules. Communication configurer module 408 can maintain an updated record of the communication attributes of one or more devices or systems. In one embodiment, communications configurer module 408 ensures that communications manager module 406 can deliver the payload provided by message processor module 404 to the destination (e.g., by ensuring that the correct protocol corresponding to the client system is used).

A communications rules provider module 410 can implement one or more communication rules that relate to details of signal transmissions or receipt. For example, a rule may specify or constrain a protocol to be used, a transmission time, a type of link or connection to be used, a destination device, and/or a number of destination devices. A rule may be generally applicable or conditionally applicable (e.g., only applying for messages corresponding to a particular app, during a particular time of day, while a device is in a particular geographical region, when a usage of a local device resource exceeds a threshold, etc.). For example, a rule can identify a technique for selecting between a set of potential destination devices based on attributes of the set of potential destination devices as tracked by communication configure module 408. To illustrate, a device having a short response latency may be selected as a destination device. As another example, communications rules provider 410 can maintain associations between various devices or systems and resources. Thus, messages corresponding to particular resources can be selectively transmitted to destinations having access to such resources.

A variety of application modules 412 can be configured to initiate message transmission, process incoming transmissions, facilitate selective granting of resource access, facilitate processing of requests for resource access, and/or performing other functions. In the instance depicted in FIG. 4, application modules 412 include an auto-updater module 414, a resource access coordinator module 416, and/or a code verification module 418.

Auto-updater module 414 automatically updates stored data and/or agent software based on recent changes to resource utilization, availability or schedules and/or updates to software or protocols. Such updates can be pushed from another device (e.g., upon detecting a change in a resource availability or access permit) or can be received in response to a request sent by device 400. For example, device 400 can transmit a signal to another device that identifies a particular resource, and a responsive signal can identify availabilities of access to the resource. As another example, device 400 can transmit a signal that includes an access access-enabling code, and a responsive signal can indicate whether the code is applicable for access of a particular resource and/or is valid.

In some instances, auto-updater module 414 is configured to enable the agent software to understand new, messages, commands, and/or protocols, based on a system configuration/change initiated on another device. Auto-updater module 414 may also install new or updated software to provide support and/or enhancements, based on a system configuration change detected on device 400. System configuration changes that would necessitate changes to the agent software can include, but are not limited to, a software/hardware upgrade, a security upgrade, a router configuration change, a change in security settings, etc. For example, if auto-updater module 414 determines that a communication link with another device has been lost for a pre-determined amount of time, auto-updater module 414 can obtain system configuration information to help re-establish the communication link. Such information may include new settings/configurations on one or more hardware devices or new or upgraded software on or connected to device 400. Thus, auto-updater module 414 can detect or be informed by other software when there is a new version of agent software with additional functionality and/or deficiency/bug corrections or when there is a change with respect to the software, hardware, communications channel, etc.), and perform updates accordingly.

Based on the newly obtained system configuration for device 400, auto-updater module 414 can cause a new communication link to be re-established with another device. In one embodiment, upon establishment of the communication link, system configuration information about device 400 can also be provided to another device to facilitate the connection to or downloading of software to device 400.

In one embodiment, when a poor health signal is detected by another device (e.g., when the health signal is only sporadically received but the communication link is not necessarily lost), the other device can send a command to auto-updater module 414 to instruct auto-updater module 414 to obtain system configuration information about device 400. The updated system configuration information may be used in an attempt to revive the unhealthy communications link (e.g., by resending a resource request). For example, code can utilize appropriate system calls for the operating system to fix or reestablish communications. By way of example and not limitation, model and driver information is optionally obtained for routers in the system in order querying them. By way of further example, if the code determines that a new brand of router has been installed, it can adapt to that change, or to the change in network configuration, or other changes.

Instead or in addition, the host server (e.g., via communications manager 406) can send specific instructions to auto-updater module 414 to specify tests or checks to be performed on device 400 to determine the changes to the system configurations (e.g., by automatically performing or requesting a check of system hardware and/or software). For example, the components involved in the chain of hops through a network can be queried and analyzed. Thus, for example, if a new ISP (Internet service provider) is being used and the management system traffic is being filtered, or a new router was installed and the software needs to change its configuration, or if someone made a change to the operating system that affects port the management system is using to communicate, the management system (or operator) can communicate with the ISP, change it back, or choose from a new available port, respectively.

The specific tests may be necessary to help establish the communication link, if, for example, the automatic tests fail to provide sufficient information for the communication link to be re-established, if additional information is needed about a particular configuration change, and/or if the client system is not initially supported by the auto-updater module 414, etc.

Auto-updater module 414 can also receive signals identifying updates pertaining to current or future availability of resources and/or access permits. Based on the signals, auto-updater module 414 can modify, add to or delete stored data pertaining to resource availabilities, resource schedules and/or valid access permits. For example, upon receiving an update signal, auto-updater 414 can modify data stored in one or more data stores 422, such as a profile data store 424, resource specification data store 426, resource status data store 428 and/or access-enabling code data store 430.

Profile data store 424 can store data for entities, such as administrators, intermediate-system agents and/or users. The profile data can include login information (e.g., username and password), identifying information (e.g., name, residential address, phone number, email address, age and/or gender), professional information (e.g., occupation, affiliation and/or professional position), and preferences (e.g., regarding resource types, entities, access right locations, and/or resource types). The profile data can also or alternatively include technical data, such a particular entity can be associated with one or more device types, IP addresses, browser identifier and/or operating system identifier).

Resource specification data store 426 can store specification data characterizing each of one or more resources. For example, specification data for a resource can include a processing power, available memory, operating system, compatibility, device type, processor usage, power status, device model, number of processor cores, types of memories, date and time of availability, a resource entity, and/or a spatial region of the resource. Specification data can further identify, for example, a cost for each of one or more access rights.

Resource status data store 428 can store status data reflecting which resources are available (or unavailable), thereby indicating which resources have one or more open assignments. In some instances, the status data can include schedule information about when a resource is available. Status data can include information identifying an entity who requested, automatically and/or tentatively assigned or was assigned a resource. In some instances, status information can indicate that a resource is being held or automatically and/or tentatively assigned and may identify an entity associated with the hold and/or a time at which the hold or reservation will be enabled to be queried.

Access-enabling code data store 430 can store access-enabling code data that includes one or more codes and/or other information that can be used to indicate that an entity is authorized to use, have or receive a resource. An access-enabling code can include, for example, a numeric string, an alphanumeric string, a text string, a 1-dimensional code, a 2-dimensional code, a barcode, a quick response (QR) code, an image, a static code and/or a temporally dynamic code. An access-enabling code can be, for example, unique across all instances, resource types and/or entities. For example, access-enabling codes provided in association for access rights to a particular resource can be unique relative to each other. In some instances, at least part of a code identifies a resource or specification of a resource.

One or more of data stores 424, 426, 428, and 430 can be a relational data store, such that elements in one data store can be referenced within another data store. For example, resource status data store 428 can associate an identifier of a particular access right with an identifier of a particular entity. Additional information about the entity can then be retrieved by looking up the entity identifier in profile data store 424.

Updates to data stores 424, 426, 428, and 430 facilitated and/or initiated by auto-updater module 414 can improve cross-device data consistency. Resource access coordinator module 416 can coordinate resource access by, for example, generating and distributing identifications of resource availabilities; processing requests for resource access; handling competing requests for resource access; and/or receiving and responding to resource-offering objectives.

Figure 5:
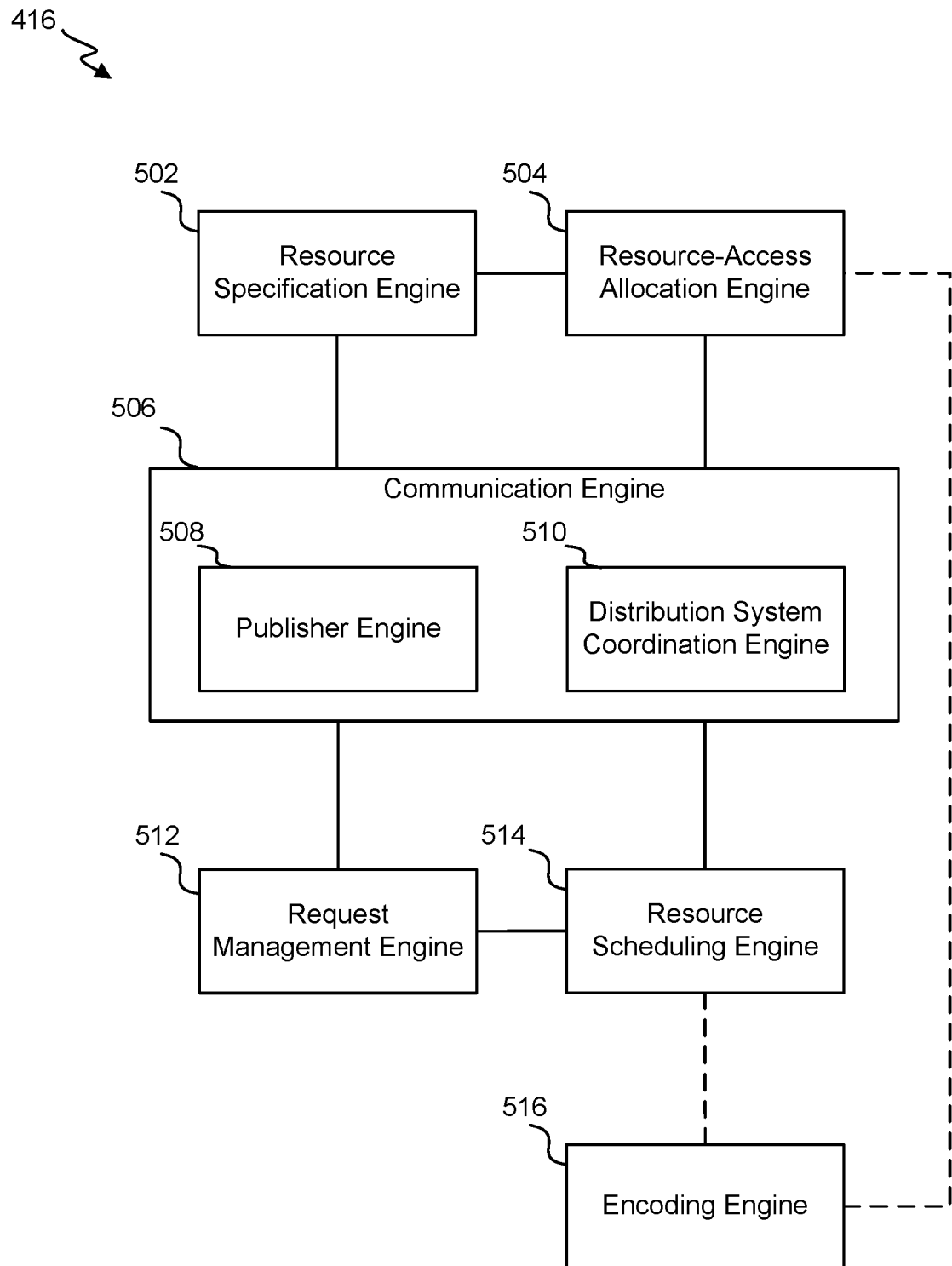
FIG. 5 illustrates example components of resource access coordinator module.

FIG. 5 illustrates example components of resource access coordinator module 416 that may operate, at least in part, at an access management system (e.g., access management system) according to an embodiment of the present disclosure. A resource specification engine 502 can identify one or more available resources. For example, resource specification engine 502 can detect input that identifies a current or future availability of a new resource.

Resource specification engine 502 can identify one or more specifications of each of one or more resources. A specification can include an availability time period. For example, resource specification engine 502 can determine that a resource is available, for example, at a particular date and time (e.g., as identified based on input), for a time period (e.g., a start to end time), as identified in the input, and/or from a time of initial identification until another input indicating that the resource is unavailable is detected. A specification can also or alternatively include a location (e.g., a geographic location and/or spatial region) of the resource. A specification can also or alternatively include one or more parties associated with the resource. Resource specification engine 502 can store the specifications in association with an identifier of the resource in resource specifications data store 426.

A resource-access allocation engine 504 can allocate access rights for individual resources. An access right can serve to provide an associated entity with the right or a priority to access a resource. Because (for example) association of an access right with an entity can, in some instances, be conditioned on one or more steps of an assignment process or authorization thereof, an allocated access right can be initially unassociated with particular entities (e.g., users). For example, an allocated right can correspond to one or more access characteristics, such as an processor identifier, a usage time, a memory allocation, and/or a geographic location. For an allocated access right, resource-access allocation engine 504 can store an identifier of the right in resource statuses data store 428 in association with an identifier for the resource and an indication that it has not yet been assigned to a particular entity.

A communication engine 506 can facilitate communicating the availability of the resource access rights to users. In some instances, a publisher engine 508 generates a presentation that identifies a resource and indicates that access rights are available. Initially or in response to user interaction with the presentation, the presentation can identify access characteristics about available access rights. The presentation can include, for example, a chart that identifies available access rights for an event. Publisher engine 508 can distribute the presentation via, for example, a website, app page, email and/or message. The presentation can be further configured to enable a user to request assignments of one or more access rights.

In some instances, an intermediate system coordination engine 510 can facilitate transmission of information about resource availability (e.g., resource specifications and characteristics of resource-access rights) to one or more intermediate systems (e.g., by generating one or more messages that include such information and/or facilitating publishing such information via a website or app page). Each of the one or more intermediate systems can publish information about the resource and accept requests for resource access. In some instances, intermediate system coordination engine 510 identifies different access rights as being available to individual intermediate systems to coordinate assignment. For example, access rights for Section 1 may be provided for a first intermediate system to assign, and access rights for Section 2 may be provided to a second intermediate system to assign.

In some instances, overlapping access rights are made available to multiple intermediate systems to coordinate assignments. For example, some or all of a first set of resource rights (e.g., corresponding to a section) may be provided to first and second intermediate systems. In such instances, intermediate system coordination engine 510 can respond to a communication from a first intermediate system indicating that a request has been received (e.g., and processed) for an access right in the set) by sending a notification to one or more other intermediate systems that indicates that the access right is to be at least temporarily (or entirely) made unavailable.

Intermediate system coordination engine 510 can monitor communication channels with intermediate systems to track the health and security of the channel. For example, a healthy connection can be inferred when scheduled signals are consistently received. Further, intermediate system coordination engine 510 can track configurations of intermediate systems (e.g., via communications generated at the intermediate systems via a software agent that identifies such configurations) so as to influence code generation, communication format, and/or provisions or access rights.

Thus, either via a presentation facilitated by publisher engine 508 (e.g., via a web site or app page) or via communication with an intermediate system, a request for assignment of an access right can be received. A request management engine 512 can process the request. Processing the request can include determining whether all other required information has been received, such as user-identifying information (e.g., name), access-right identifying information (e.g., identifying a resource and/or access-right characteristic) user contact information, and/or user device information (e.g., type of device, device identifier, and/or IP address).

When all required information has not been received, request management engine 512 can facilitate collection of the information (e.g., via an interface, app page or communication to an intermediate system). Request management engine 512 can also or alternatively execute or facilitate the execution of the assignment process, which includes one or more steps for completing an assignment of an access right to a user device or user profile. For example, publisher engine 508 may receive data inputted by the user via an interface, and request management engine 512 can request authorization to complete the assignment process. In some instances, request management engine 512 retrieves data from a user profile. For example, publisher engine 508 may indicate that a request for an access right has been received while a user was logged into a particular profile. Request management engine 512 may then retrieve, for example, contact information, device information, and/or preferences information associated with the profile from profile data store 424.

In some instances, request management engine 512 prioritizes requests, such as requests for overlapping, similar or same access rights received within a defined time period. The prioritization can be based on, for example, times at which requests were received (e.g., prioritizing earlier requests), a request parameter (e.g., prioritizing requests for a higher or lower number of access rights above others), whether requests were received via an intermediate system (e.g., prioritizing such requests lower than others), intermediate systems associated with requests, whether requests were associated with users having established profiles, and/or whether requests were associated with inputs indicative of a bot initiating the request (e.g., shorter inter-click intervals, failed CAPTCHA tests).

Upon determining that required information has been received and request-processing conditions have been met, request management engine 512 can forward appropriate request information to a resource scheduling engine 514. For a request, resource scheduling engine 514 can query resource status data store 428 to identify access rights matching parameters of the request.

In some instances, the request has an access-right specificity matching a specificity at which access rights are assigned. In some instances, the request is less specific, and resource scheduling engine 514 can then facilitate an identification of particular rights to assign. For example, request management engine 512 can facilitate a communication exchange by which access right characteristics matching the request are identified, and a user is allowed to select particular rights. As another example, request management engine 512 can itself select from amongst matching access rights based on a defined criterion (e.g., best summed or averaged access-right ranking, pseudo-random selection, or a selection technique identified based on user input).

Upon identifying appropriately specific access rights, resource scheduling engine 514 can update resource status data store 428 so as to place the access right(s) on hold (e.g., while obtaining user confirmation) and/or to change a status of the access right(s) to indicate that they have been assigned (e.g., immediately, upon completing an assignment process or upon receiving user confirmation). Such assignment indication may associate information about the user (e.g., user name, device information, phone number and/or email address) and/or assignment process (e.g., identifier of any intermediate system and/or assignment date and time) with an identifier of the access right(s).

For individual assigned access rights, an encoding engine 516 can generate an access-enabling code. The access-enabling code can include, for example, an alphanumeric string, a text string, a number, a graphic, a code (e.g., a 1-dimensional or 2-dimensional code), a static code, a dynamic code (e.g., with a feature depending on a current time, current location or communication) and/or a technique for generating the code (e.g., whereby part of the code may be static and part of the code may be determined using the technique). The code may be unique across all access rights, all access rights for a given resource, all access rights associated with a given location, all access rights associated with a given time period, all resources and/or all users. In some instances, at least part of the code is determined based on or is thereafter associated with an identifier of a user, user device information, a resource specification and/or an access right characteristic.

In various embodiments, the code may be generated prior to allocating access rights (e.g., such that each of some or all allocated access rights are associated with an access-enabling code), prior to or while assigning one or more access right(s) responsive to a request (e.g., such that each of some or all assigned access rights are associated with an access-enabling code), at a prescribed time, and/or when the device is at a defined location and/or in response to user input. The code may be stored at or availed to a user device. In various instances, at the user device, an access-enabling code may be provided in a manner such that it is visibly available for user inspection or concealed from a user. For example, a physical manifestation of an access right may be a document with an access code, and a copy of this document may be transmitted to a user device, or an app on the user device can transmit a request with a device identifier for a dynamic code.

Encoding engine 516 can store the access-enabling codes in access-enabling code data store 430. Encoding engine 516 can also or alternatively store an indication in profile data store 424 that the access right(s) have been assigned to the user. It will again be appreciated that data stores 424, 426, 428, and 430 can be relational and/or linked, such that, for example, an identification of an assignment can be used to identify one or more access rights, associated access-enabling code(s) and/or resource specifications.

Resource scheduling engine 514 can facilitate one or more transmissions of data pertaining to one or more assigned access rights to a device of a user associated with the assignment and/or to an intermediate system facilitating the assignment and/or having transmitted a corresponding assignment request. The data can include an indication that access rights have been assigned and/or details as to which rights have been assigned. The data can also or alternatively include access-enabling codes associated with assigned access rights.

While FIG. 5 depicts components of resource access coordinator module 516 that may be present on an access management system 120, it will be appreciated that similar or complementary engines may be present on other systems. For example, a communication engine on a user device can be configured to display presentations identifying access right availability, and a request management engine on a user device can be configured to translate inputs into access-right requests to send to an intermediate system or access management system.

Returning to FIG. 4, code verification module 418 (e.g., at a user device or client device) can analyze data to determine whether an access-enabling code is generally valid and/or valid for a particular circumstance. The access-enabling code can include one that is received at or detected by device 400. The analysis can include, for example, determining whether all or part of the access-enabling code matches one stored in access-enabling code data store 430 or part thereof, whether the access-enabling code has previously been applied, whether all or part of the access-enabling code is consistent with itself or other information (e.g., one or more particular resource specifications, a current time and/or a detected location) as determined based on a consistency analysis and/or whether all or part of the access-enabling code has an acceptable format.

For example, access-enabling code data store 430 can be organized in a manner such that access-enabling codes for a particular resource, date, resource group, client, etc. can be queried to determine whether any such access-enabling codes correspond to (e.g. match) one being evaluated, which may indicate that the code is verified. Additional information associated with the code may also or alternatively be evaluated. For example, the additional information can indicate whether the code is currently valid or expired (e.g., due to a previous use of the code).

As another example, a portion of an access-enabling code can include an identifier of a user device or user profile, and code verification module 418 can determine whether the code-identified device or profile matches that detected as part of the evaluation. To illustrate, device 400 can be a client device that electronically receives a communication with an access-enabling code from a user device. The communication can further include a device identifier that identifies, for example, that the user device is a particular type of smartphone. Code verification module 418 can then determine whether device-identifying information in the code is consistent with the identified type of smartphone.

As yet another example, code verification module 418 can identify a code format rule that specifies a format that valid codes are to have. To illustrate, the code format rule may identify a number of elements that are to be included in the code or a pattern that is to be present in the code. Code verification module 418 can then determine that a code is not valid if it does not conform to the format.

Verification of an access-enabling code can indicate that access to a resource is to be granted. Conversely, determining that a code is not verified can indicate that access to a resource is to be limited or prevented. In some instances, a presentation is generated (e.g., and presented) that indicates whether access is to be granted and/or a result of a verification analysis. In some instances, access granting and/or limiting is automatically affected. For example, upon a code verification, a user device and/or user may be automatically permitted to access a particular resource. Accessing a resource may include, for example, using a computational resource, possessing an item, receiving a service, entering a geographical area, and/or attending an event (e.g., generally or at a particular location).

Verification of an access-enabling code can further trigger a modification to access-enabling code data store 430. For example, a code that has been verified can be removed from the data store or associated with a new status. This modification may limit attempts to use a same code multiple times for resource access.

A combination of modules 414, 416, 418 comprise a secure addressable endpoint agent 420 that acts as an adapter and enables cross-device interfacing in a secure and reliable manner so as to facilitate allocation of access-enabling codes and coordinate resource access. Secure addressable endpoint agent 420 can further generate a health signal that is transmitted to another device for monitoring of a status of a communication channel. The health signal is optionally a short message of a few bytes or many bytes in length that may be transmitted on a frequent basis (e.g., every few milliseconds or seconds). A communications manager 406 on the receiving device can then monitors the health signal provided by the agent to ensure that the communication link between the host server and device 400 is still operational.

In some instances, device 400 can include (or can be in communication with) a physical access control 432. Physical access control 432 can include a gating component that can be configured to provide a physical barrier towards accessing a resource. For example, physical access control 432 can include a turnstile or a packaging lock.

Physical access control 432 can be configured such that it can switch between two modes, which differ in terms of a degree to which user access to a resource is permitted. For example, a turnstile may have a locked mode that prevents movement of an arm of the turnstile and an unlocked mode that allows the arm to be rotated. In some instances, a default mode is the mode that is more limiting in terms of access.

Physical access control 432 can switch its mode in response to receiving particular results from code verification module 418. For example, upon receiving an indication that a code has been verified, physical access control 432 can switch from a locked mode to an unlocked mode. It may remain in the changed state for a defined period of time or until an action or event is detected (e.g., rotation of an arm).

Device 400 can also include one or more environmental sensors 434. Measurements from the sensor can processed by one or more application modules. Environmental sensor(s) 434 can include a global positioning system (GPS)

receiver 435 that can receive signals from one or more GPS satellites. A GPS chipset can use the signals to estimate a location of device 400 (e.g., a longitude and latitude of device 400). The estimated location can be used to identify a particular resource (e.g., one being offered at or near the location at a current or near-term time). The identification of the particular resource can be used, for example, to identify a corresponding (e.g., user-associated) access-enabling code or to evaluate an access-enabling code (e.g., to determine whether it corresponds to a resource associated with the location).

The estimated location can further or alternatively be used to determine when to perform a particular function. For example, at a user device, detecting that the device is in or has entered a particular geographical region (e.g., is within a threshold distance from a geofence perimeter or entrance gate) can cause the device to retrieve or request an access-enabling code, conduct a verification analysis of the code and/or transmit the code to a client device.

It will be appreciated that environmental sensor(s) 434 can include one or more additional or alternative sensors aside from GPS receiver 435. For example, a location of device 400 can be estimated based on signals received by another receive from different sources (e.g., base stations, client point devices or Wi Fi access points). As another example, an accelerometer and/or gyroscope can be provided. Data from these sensors can be used to infer when a user is attempting to present an access-enabling code for evaluation.

It will also be appreciated that the components and/or engines depicted in figures herein are illustrative, and a device need not include each depicted component and/or engine and/or can include one or more additional components and/or engines. For example, a device can also include a user interface, which may include a touch sensor, keyboard, display, camera and/or speakers. As another example, a device can include a power component, which can distribute power to components of the device. The power component can include a battery and/or a connection component for connecting to a power source. As yet another example, a module in the application layer can include an operating system. As still another example, an application-layer control processor module can provide message processing for messages received from another device. The message processing can include classifying the message and routing it to the appropriate module. To illustrate, the message can be classified as a request for resource access or for an access-enabling code, an update message or an indication that a code has been redeemed or verified. The message processing module can further convert a message or command into a format that can interoperate with a target module.

It will further be appreciated that the components, modules and/or agents could be implemented in one or more instances of software. The functionalities described herein need not be implemented in separate modules, for example, one or more functions can be implemented in one software instance and/or one software/hardware combination. Other combinations are similarly be contemplated.

Further yet, it will be appreciated that a storage medium (e.g., using magnetic storage media, flash memory, other semiconductor memory (e.g., DRAM, SRAM), or any other non-transitory storage medium, or a combination of media, and can include volatile and/or non-volatile media) can be used to store program code for each of one or more of the components, modules and/or engines depicted in FIGS. 4 and 5 and/or to store any or all data stores depicted in FIG. 4 or described with reference to FIGS. 4 and/or 5. Any device or system disclosed herein can include a processing subsystem for executing the code. The processing system can be implemented as one or more integrated circuits, e.g., one or more single-core or multi-core microprocessors or microcontrollers, examples of which are known in the art.

Figure 6:
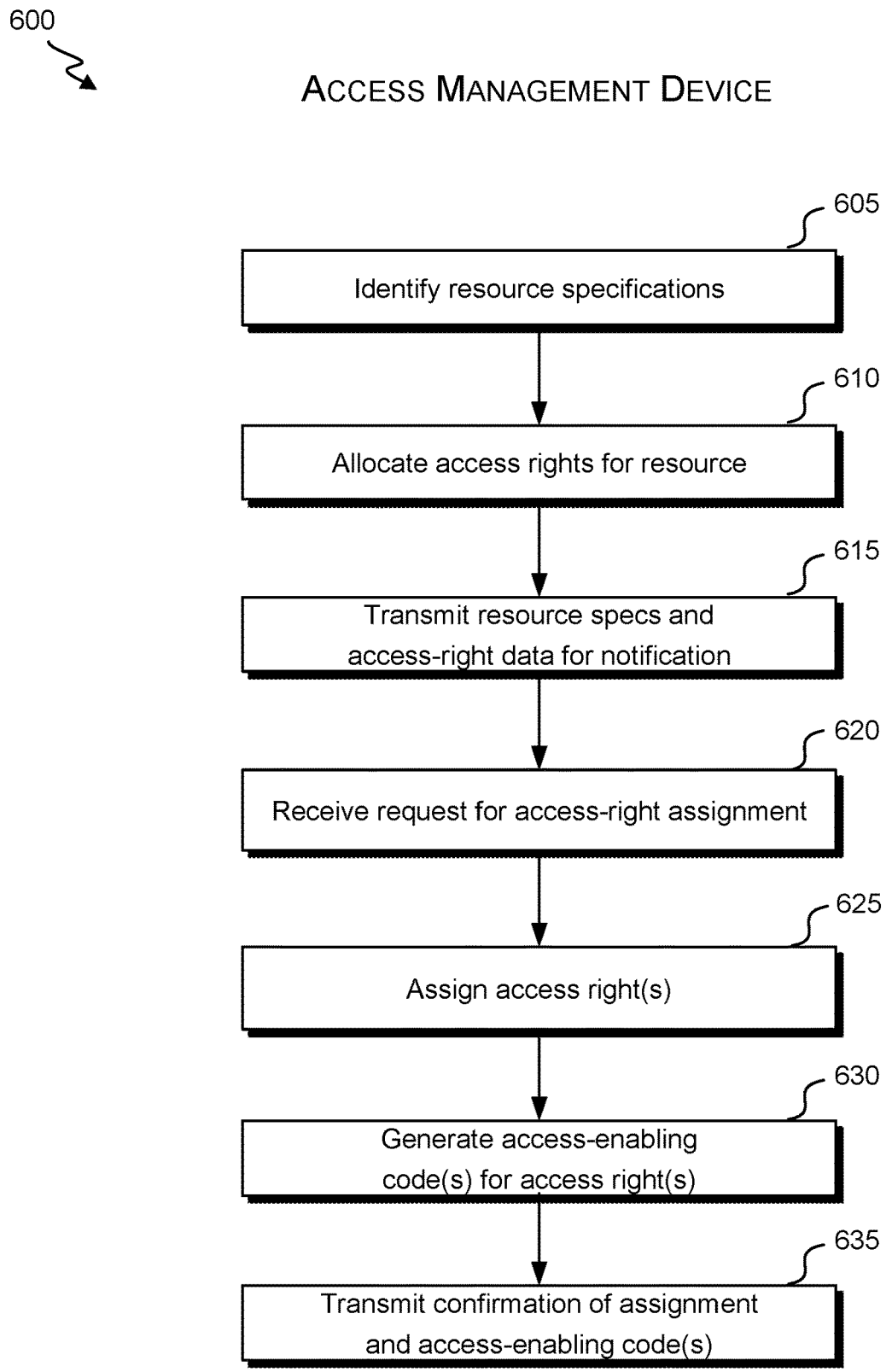
FIG. 6 illustrates a flowchart of an embodiment of a process for assigning access rights for resources.

FIG. 6 illustrates a flowchart of an embodiment of a process 600 for assigning access rights for resources. Process 600 can be performed by an access management system, such as access management system 120. Process 600 begins at block 605 where resource specification engine 502 identifies one or more specifications for a resource. The specifications can include, for example, a time at which the resource is to be available, a location of the resource, a capacity of the resources and/or one or more entities (e.g., performing entities) associated with the resource.

At block 610, resource-access allocation engine 504 allocates a set of access rights for the resource. In some instances, each of at least some of the access rights corresponds to a different access parameter, such as a different location assignment. Upon allocation, each of some or all of the access rights may have a status as available. A subset of the set of access rights can be immediately (or at a defined time) assigned or reserved according to a base assignment or reservation rule (e.g., assigning particular access rights to particular entities, who may be involved in or related to provision of the resource and/or who have requested or been assigned a set of related access rights.

At block 615, communication engine 506 transmits the resource specifications and data about the access rights. The transmission can occur in one or more transmissions. The transmission can be to, for example, one or more user devices and/or intermediate systems. In some instances, a notification including the specifications and access-right data is transmitted, and in some instances, a notification can be generated at a receiving device based on the specifications and access-right data. The notification can include, for example, a website that identifies a resource (via, at least in part, its specifications) and indicates that access rights for the resource are available for assignment. The notification can include an option to request assignment of one or more access rights.

At block 620, request management engine 512 receives a request for one or more access rights to be assigned to a user. The request can, for example, identify particular access rights and/or access parameters. The request can include or be accompanied by other information, such as identifying information. In some instances, the access management system can use at least some of such information to determine whether an assignment process has been completed. In some instances, the request is received via an intermediate system that has already handled such authorization.

At block 625, resource scheduling engine 514 assigns the requested one or more access rights to the user. The assignment can be conditioned on receipt of all required information, confirmation that the access right(s) have remained available for assignment, determining using data corresponding to the request that a bot-detection condition is not satisfied and/or other defined conditions. Assignment of the access right(s) can include associating an identifier of each of the one or more rights with an identifier of a user and/or assignment and/or changing a status of the access right(s) to assigned. Assignment of the access right(s) can result in impeding or preventing other users from requesting the access right(s), being assigned the access right(s) and/or being notified that the access right(s) are available for assignment. Assignment of the access right(s) can, in some instances, trigger transmission of one or more communications to, for example, one or more intermediate systems identifying the access right(s) and indicating that they have been assigned and/or with an instruction to cease offering the access rights.

At block 630, encoding engine 516 generates an access-enabling code for each of the one or more access rights. The code can be generated, for example, as part of the assignment, as part of the allocation or subsequent to the assignment (e.g., upon detecting that a user is requesting access to the resource). Generating an access-enabling code can include applying a code-generation technique, such on one that generates a code based on a characteristic of a user, user device, current time, access right, resource, intermediate system or other variable. The access-enabling code can include a static code that will not change after it has been initially generated or a dynamic code that changes in time (e.g., such that block 630 can be repeated at various time points).

At block 635, communication engine 506 transmits a confirmation of the assignment and the access-enabling code(s) in one or more transmissions. The transmission(s) may be sent to one or more devices, such as a user device having initiated the request from block 620, a remote server or an intermediate system having relayed the request from block 620.

Figure 7A:
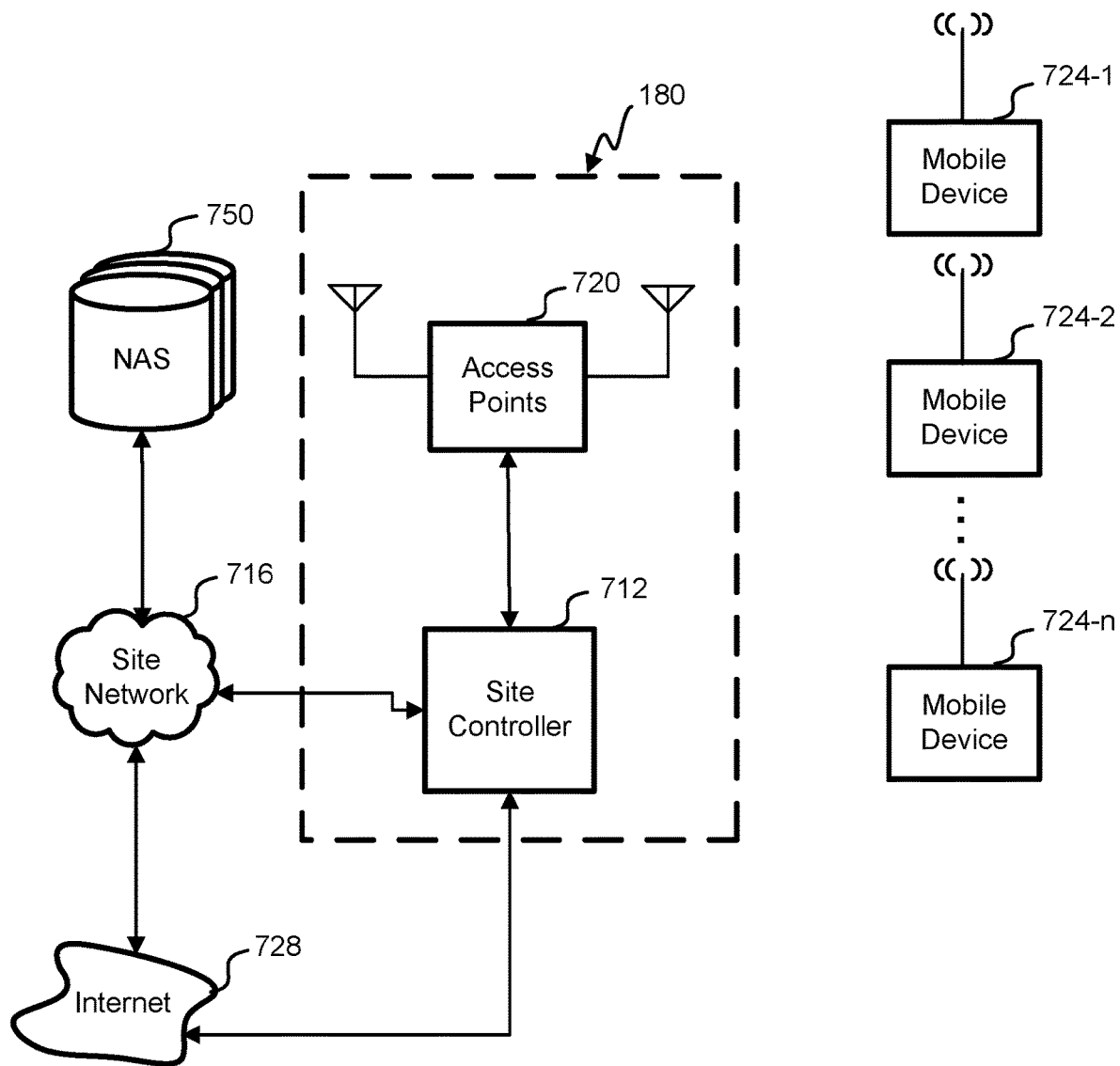
FIGS. 7A and 7B show embodiments of site systems in relations to mobile devices.

Referring to FIG. 7A, an embodiment of a site system 180 is shown in relation to mobile devices 724-*n*, Network Attached Storage (NAS) 750, site network 716 and the Internet 728. In some embodiments, for users located within the spatial region of the resource, site network 716 and site system 180 provide content, services and/or interactive engagement using mobile devices 724. Connections to site system 180 and site network 716 can be established by mobile devices 724 connecting to access points 720. Mobile devices 724 can be a type of end user device 110 that is portable, e.g., smartphones, mobile phones, tablets, and/or other similar devices.

Site network 716 can have access to content (information about the resource, videos, images, etc.) held by NAS 750. Additionally, as described herein, content can be gathered from users both before and during the time period the resource is accessible. By connecting to site network 716, mobile device 724 can send content for use by site system 180 or display content received from NAS 750.

Figure 7B:
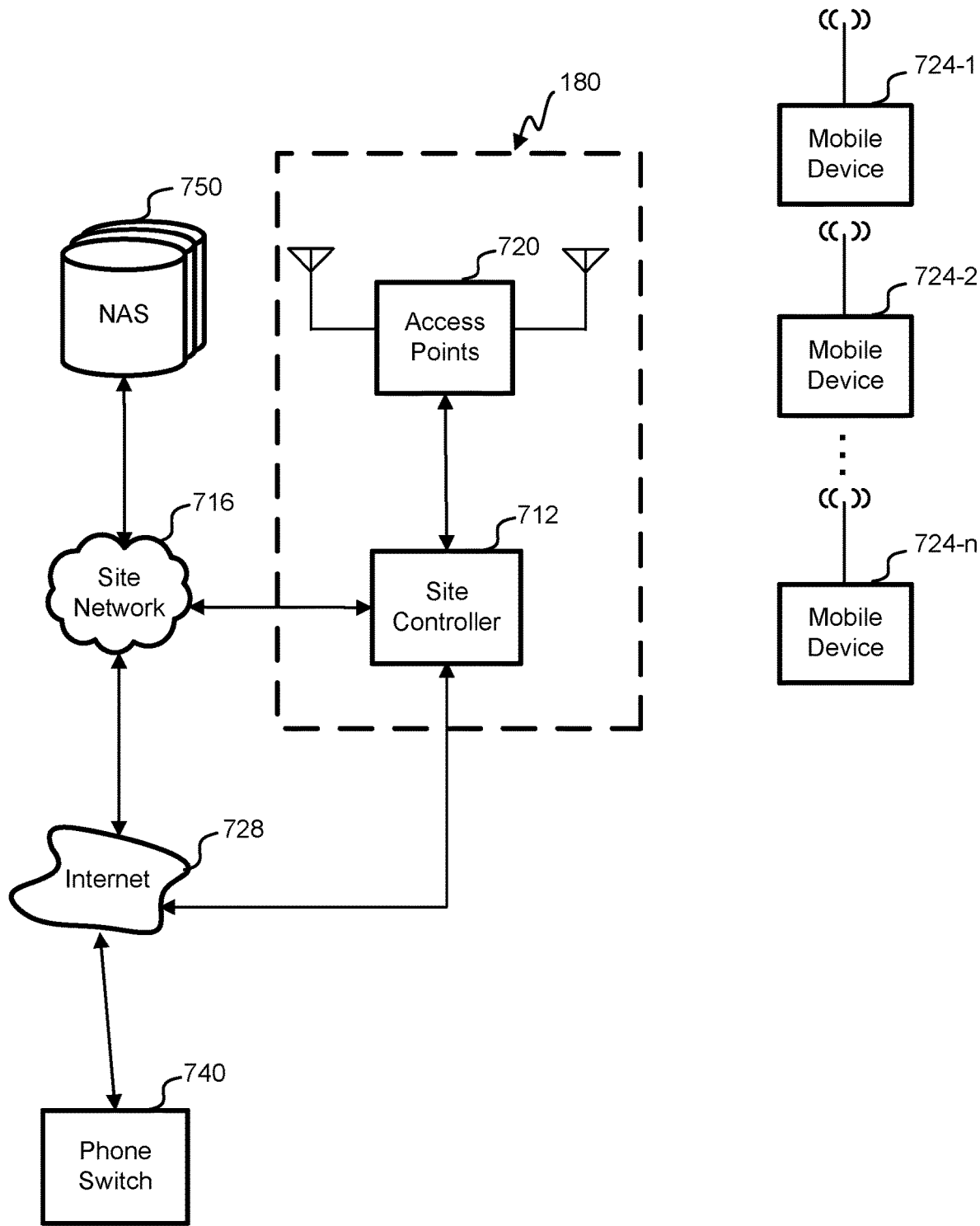

Referring to FIG. 7B, another embodiment of a site system 180 is shown in relation to mobile devices 724-*n*, Network Attached Storage (NAS) 750, site network 716 and the Internet 728, in an embodiment. FIG. 7B additionally includes phone switch 740. In some embodiments, phone switch 740 can be a private cellular base station configured to spoof the operation of conventionally operated base stations. Using phone switch 740 at an event site allows site system 180 to provide additional types of interactions with mobile devices 724. For example, without any setup or configuration to accept communications from site controller 712, phone switch 740 can cause connected mobile devices 724 to ring and, when answered, have an audio or video call be established. When used with other embodiments described herein, phone switch 740 can provide additional interactions. For example, some embodiments described herein use different capabilities of mobile devices 724 to cause mass sounds and/or establish communications with two or more people. By causing phones to ring and by establishing cellular calls, phone switch can provide additional capabilities to these approaches.

Figure 8:
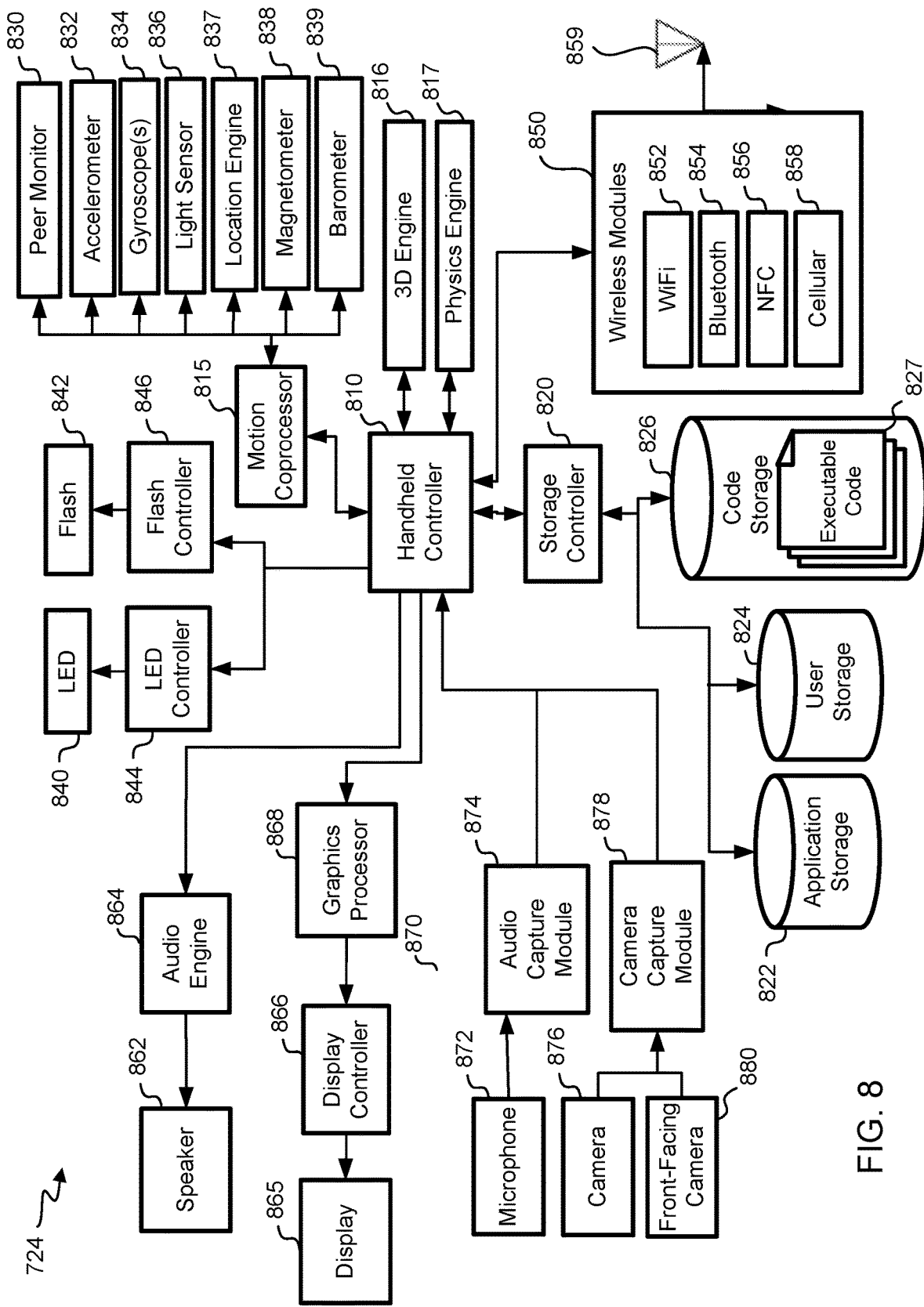
FIG. 8 shows a block diagram of user device according to an embodiment.

FIG. 8 shows a block diagram of user device 110 according to an embodiment. User device 110 includes a handheld controller 810 that can be sized and shaped so as enable the controller and user device 110 in a hand. Handheld controller 810 can include one or more user-device processors that can be configured to perform actions as described herein. In some instances, such actions can include retrieving and implementing a rule, retrieving an access-enabling code, generating a communication (e.g., including an access-enabling code) to be transmitted to another device (e.g., a nearby client-associated device, a remote device, a central server, a web server, etc.), processing a received communication (e.g., to perform an action in accordance with an instruction in the communication, to generate a presentation based on data in the communication, or to generate a response communication that includes data requested in the received communication) and so on.

Handheld controller 810 can communicate with a storage controller 820 so as to facilitate local storage and/or retrieval of data. It will be appreciated that handheld controller 810 can further facilitate storage and/or retrieval of data at a remote source via generation of communications including the data (e.g., with a storage instruction) and/or requesting particular data.

Storage controller 820 can be configured to write and/or read data from one or more data stores, such as an application storage 822 and/or a user storage 824. The one or more data stores can include, for example, a random access memory (RAM), dynamic random access memory (DRAM), read-only memory (ROM), flash-ROM, cache, storage chip, and/or removable memory. Application storage 822 can include various types of application data for each of one or more applications loaded (e.g., downloaded or pre-installed) onto user device 110. For example, application data can include application code, settings, profile data, databases, session data, history, cookies and/or cache data. User storage 824 can include, for example, files, documents, images, videos, voice recordings and/or audio. It will be appreciated that user device 110 can also include other types of storage and/or stored data, such as code, files and data for an operating system configured for execution on user device 110.

Handheld controller 810 can also receive and process (e.g., in accordance with code or instructions generated in correspondence to a particular application) data from one or more sensors and/or detection engines. The one or more sensors and/or detection engines can be configured to, for example, detect a presence, intensity and/or identify of (for example) another device (e.g., a nearby device or device detectable over a particular type of network, such as a Bluetooth, Bluetooth Low-Energy or Near-Field Communication network); an environmental, external stimulus (e.g., temperature, water, light, motion or humidity); an internal stimulus (e.g., temperature); a device performance (e.g., processor or memory usage); and/or a network connection (e.g., to indicate whether a particular type of connection is available, a network strength and/or a network reliability).

FIG. 8 shows several exemplary sensors and detection engines, including a peer monitor 830, accelerometer 832, gyroscope 834, light sensor 836 and location engine 838. Each sensor and/or detection engine can be configured to collect a measurement or make a determination, for example, at routine intervals or times and/or upon receiving a corresponding request (e.g., from a processor executing an application code).

Peer monitor 830 can monitor communications, networks, radio signals, short-range signals, etc., which can be received by a receiver of user device 110) Peer monitor 830 can, for example, detect a short-range communication from another device and/or use a network multicast or broadcast to request identification of nearby devices. Upon or while detecting another device, peer monitor 830 can determine an identifier, device type, associated user, network capabilities, operating system and/or authorization associated with the device. Peer monitor 530 can maintain and update a data structure to store a location, identifier and/or characteristic of each of one or more nearby user devices.

Accelerometer 832 can be configured to detect a proper acceleration of user device 110. The acceleration may include multiple components associated with various axes and/or a total acceleration. Gyroscope 834 can be configured to detect one or more orientations (e.g., via detection of angular velocity) of user device 110. Gyroscope 834 can include, for example, one or more spinning wheels or discs, single- or multi-axis (e.g., three-axis) MEMS-based gyroscopes.

Light sensor 836 can include, for example, a photosensor, such as photodiode, active-pixel sensor, LED, photoresistor, or other component configured to detect a presence, intensity and/or type of light. In some instances, the one or more sensors and detection engines can include a motion detector, which can be configured to detect motion. Such motion detection can include processing data from one or more light sensors (e.g., and performing a temporal and/or differential analysis).

Location engine 838 can be configured to detect (e.g., estimate) a location of user device 110. For example, location engine 838 can be configured to process signals (e.g., a wireless signal, GPS satellite signal, cell-tower signal, iBeacon, or base-station signal) received at one or more receivers (e.g., a wireless-signal receiver and/or GPS receiver) from a source (e.g., a GPS satellite, cellular tower or base station, or WiFi access point) at a defined or identifiable location. In some instances, location engine 838 can process signals from multiple sources and can estimate a location of user device 110 using a triangulation technique. In some instances, location engine 838 can process a single signal and estimate its location as being the same as a location of a source of the signal.

User device 110 can include a flash 842 and flash controller 846. Flash 842 can include a light source, such as (for example), an LED, electronic flash or high-speed flash. Flash controller 846 can be configured to control when flash 842 emits light. In some instances, the determination includes identifying an ambient light level (e.g., via data received from light sensor 836) and determining that flash 842 is to emit light in response to a picture- or movie-initiating input when the light level is below a defined threshold (e.g., when a setting is in an auto-flash mode). In some additional or alternative instances, the determination includes determining that flash 846 is, or is not, to emit light in accordance with a flash on/off setting. When it is determined that flash 846 is to emit light, flash controller 846 can be configured to control a timing of the light so as to coincide, for example, with a time (or right before) at which a picture or video is taken.

User device 110 can also include an LED 840 and LED controller 844. LED controller 844 can be configured to control when LED 840 emits light. The light emission may be indicative of an event, such as whether a message has been received, a request has been processed, an initial access time has passed, etc.

Flash controller 846 can control whether flash 846 emits light via controlling a circuit so as to complete a circuit between a power source and flash 846 when flash 842 is to emit light. In some instances, flash controller 846 is wired to a shutter mechanism so as to synchronize light emission and collection of image or video data.

User device 110 can be configured to transmit and/or receive signals from other devices or systems (e.g., over one or more networks, such as network(s) 170). These signals can include wireless signals, and accordingly user device 110 can include one or more wireless modules 850 configured to appropriately facilitate transmission or receipt of wireless signals of a particular type. Wireless modules 850 can include a Wi-Fi module 852, Bluetooth module 854, near-field communication (NFC) module 856 and/or cellular module 856. Each module can, for example, generate a signal (e.g., which may include transforming a signal generated by another component of user device 110 to conform to a particular protocol and/or to process a signal (e.g., which may include transforming a signal received from another device to conform with a protocol used by another component of user device 110).

Wi-Fi module 854 can be configured to generate and/or process radio signals with a frequency between 2.4 gigahertz and 5 gigahertz. Wi-Fi module 854 can include a wireless network interface card that includes circuitry to facilitate communicating using a particular standard (e.g., physical and/or link layer standard).

Bluetooth module 854 can be configured to generate and/or process radio signals with a frequency between 2.4 gigahertz and 2.485 gigahertz. In some instances, bluetooth module 854 can be configured to generate and/or process Bluetooth low-energy (BLE or BTLE) signals with a frequency between 2.4 gigahertz and 2.485 gigahertz.

NFC module 856 can be configured to generate and/or process radio signals with a frequency of 13.56 megahertz. NFC module 856 can include an inductor and/or can interact with one or more loop antenna.

Cellular module 858 can be configured to generate and/or process cellular signals at ultra-high frequencies (e.g., between 698 and 2690 megahertz). For example, cellular module 858 can be configured to generate uplink signals and/or to process received downlink signals.

The signals generated by wireless modules 850 can be transmitted to one or more other devices (or broadcast) by one or more antennas 859. The signals processed by wireless modules 850 can include those received by one or more antennas 859. One or more antennas 859 can include, for example, a monopole antenna, helical antenna, intenna, Planar Inverted-F Antenna (PIFA), modified PIFA, and/or one or more loop antennae.

User device 110 can include various input and output components. An output component can be configured to present output. For example, a speaker 862 can be configured to present an audio output by converting an electrical signal into an audio signal. An audio engine 864 can effect particular audio characteristics, such as a volume, event-to-audio-signal mapping and/or whether an audio signal is to be avoided due to a silencing mode (e.g., a vibrate or do-not-disturb mode set at the device).

Further, a display 866 can be configured to present a visual output by converting an electrical signal into a light signal. Display 866 may include multiple pixels, each of which may be individually controllable, such that an intensity and/or color of each pixel can be independently controlled. Display 866 can include, for example, an LED- or LCD-based display.

A graphics engine 868 can determine a mapping of electronic image data to pixel variables on a screen of user device 110. It can further adjust lighting, texture and color characteristics in accordance with, for example, user settings.

In some instances, display 866 is a touchscreen display (e.g., a resistive or capacitive touchscreen) and is thus both an input and an output component. A screen controller 870 can be configured to detect whether, where and/or how (e.g., a force of) a user touched display 866. The determination may be made based on an analysis of capacitive or resistive data.

An input component can be configured to receive input from a user that can be translated into data. For example, as illustrated in FIG. 8, user device 110 can include a microphone 872 that can capture audio data and transform the audio signals into electrical signals. An audio capture module 874 can determine, for example, when an audio signal is to be collected and/or any filter, equalization, noise gate, compression and/or clipper that is to be applied to the signal.

User device 110 can further include one or more cameras 876, 880, each of which can be configured to capture visual data (e.g., at a given time or across an extended time period) and convert the visual data into electrical data (e.g., electronic image or video data). In some instances, user device 110 includes multiple cameras, at least two of which are directed in different and/or substantially opposite directions. For example, user device 110 can include a rear-facing camera 876 and a front-facing camera 880.

A camera capture module 878 can control, for example, when a visual stimulus is to be collected (e.g., by controlling a shutter), a duration for which a visual stimulus is to be collected (e.g., a time that a shutter is to remain open for a picture taking, which may depend on a setting or ambient light levels; and/or a time that a shutter is to remain open for a video taking, which may depend on inputs), a zoom, a focus setting, and so on. When user device 110 includes multiple cameras, camera capture module 878 may further determine which camera(s) is to collect image data (e.g., based on a setting).

Figure 9:
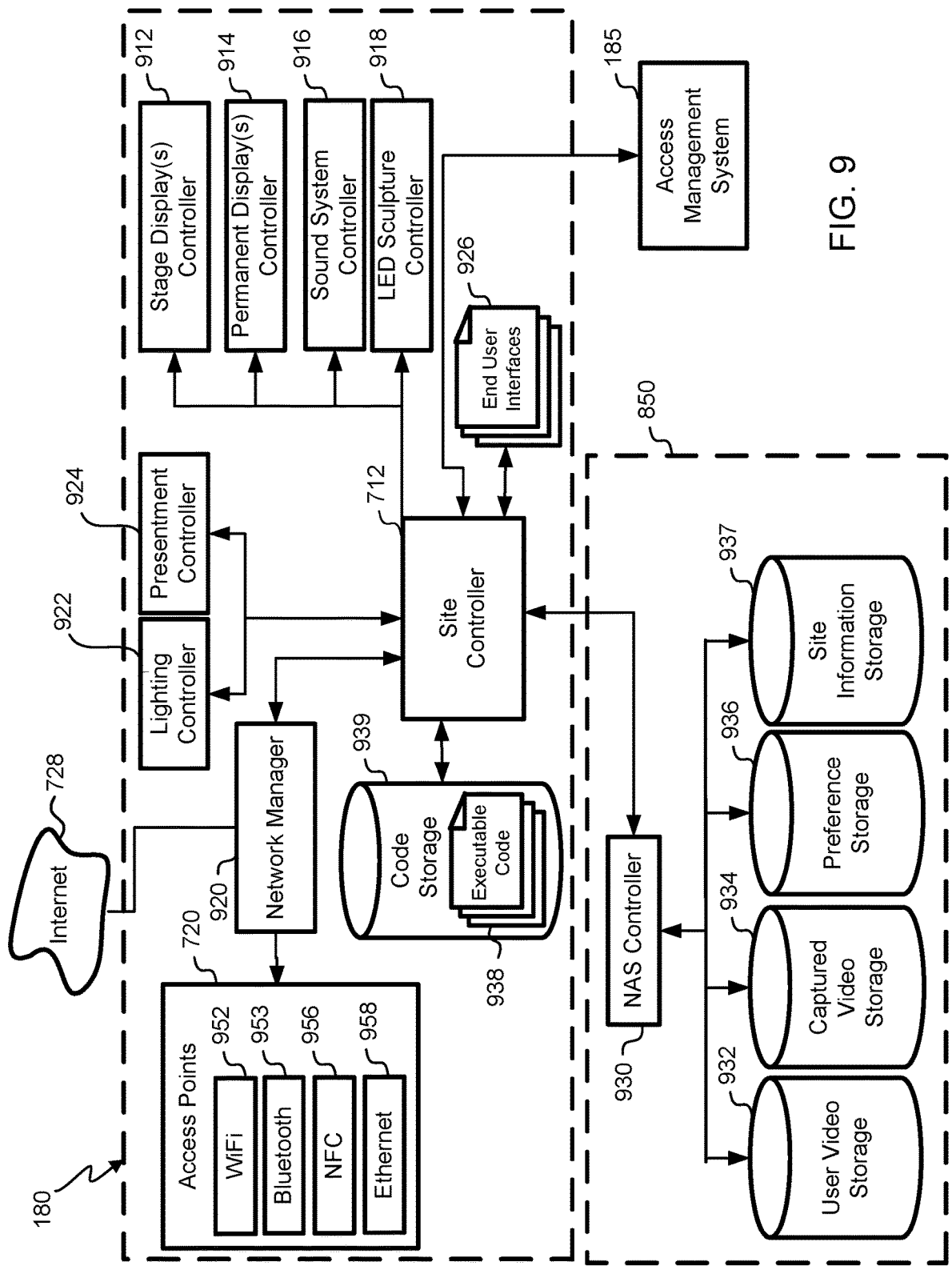
FIG. 9 illustrates sample components of an embodiment of site system 180, including connections to a NAS and access management system.

FIG. 9 illustrates sample components of an embodiment of site system 180, including connections to NAS 750 and access management system 185. Embodiments of site controller 712 use network manager 920 to connect via access points 720 (using e.g., WiFi 952, Bluetooth 953, NFC 956, Ethernet 958, and/or other network connections) to other network components, such as site network 716 and mobile devices 724. In some embodiments, site system 280 uses site controller 712 to control aspects of a spatial region associated with a resource. An access right grants access to the spatial region during a defined time period. A broad variety of features can be controlled by different embodiments, including: permanent lights (e.g., with lighting controller 922), lights (e.g., with presentment controller 924), display screens (e.g., with stage display(s) controller 912), permanent display screens (e.g., with permanent display(s) controller 914), and the sound system (e.g., with the sound system controller 916).

A more detailed view of NAS 750 is shown, including NAS controller 930 coupled to user video storage 932, captured video storage 934, preference storage 936, and 3D model 938. Captured video storage 934 can receive, store and provide user videos received from mobile devices 724. In some embodiments, site controller 712 triggers the automatic capture of images, audio and video from mobile devices 724, such triggering being synchronized to activities in an event. Images captured by this and similar embodiments can be stored on both the capturing mobile device 724 and user video storage 932. In an embodiment, site controller 712 can coordinate the transfer of information from mobile devices to NAS 750 (e.g., captured media) with activities taking place during the event. When interacting with mobile devices 724, some embodiments of site controller 712 can provide end user interfaces 926 to enable different types of interaction. For example, as a part of engagement activities, site controller may offer quizzes and other content to the devices. Additionally, with respect to location determinations discussed herein, site controller can supplement determined estimates with voluntarily provided information using end user interfaces 926, stored in a storage that is not shown.

In some embodiments, to guide the performance of different activities, site controller 712 and/or other components may use executable code 938 tangibly stored in code storage 939. In some embodiments, site information storage 937 can provide information about the site, e.g., 3D models of site features and structure.

Figure 10A:
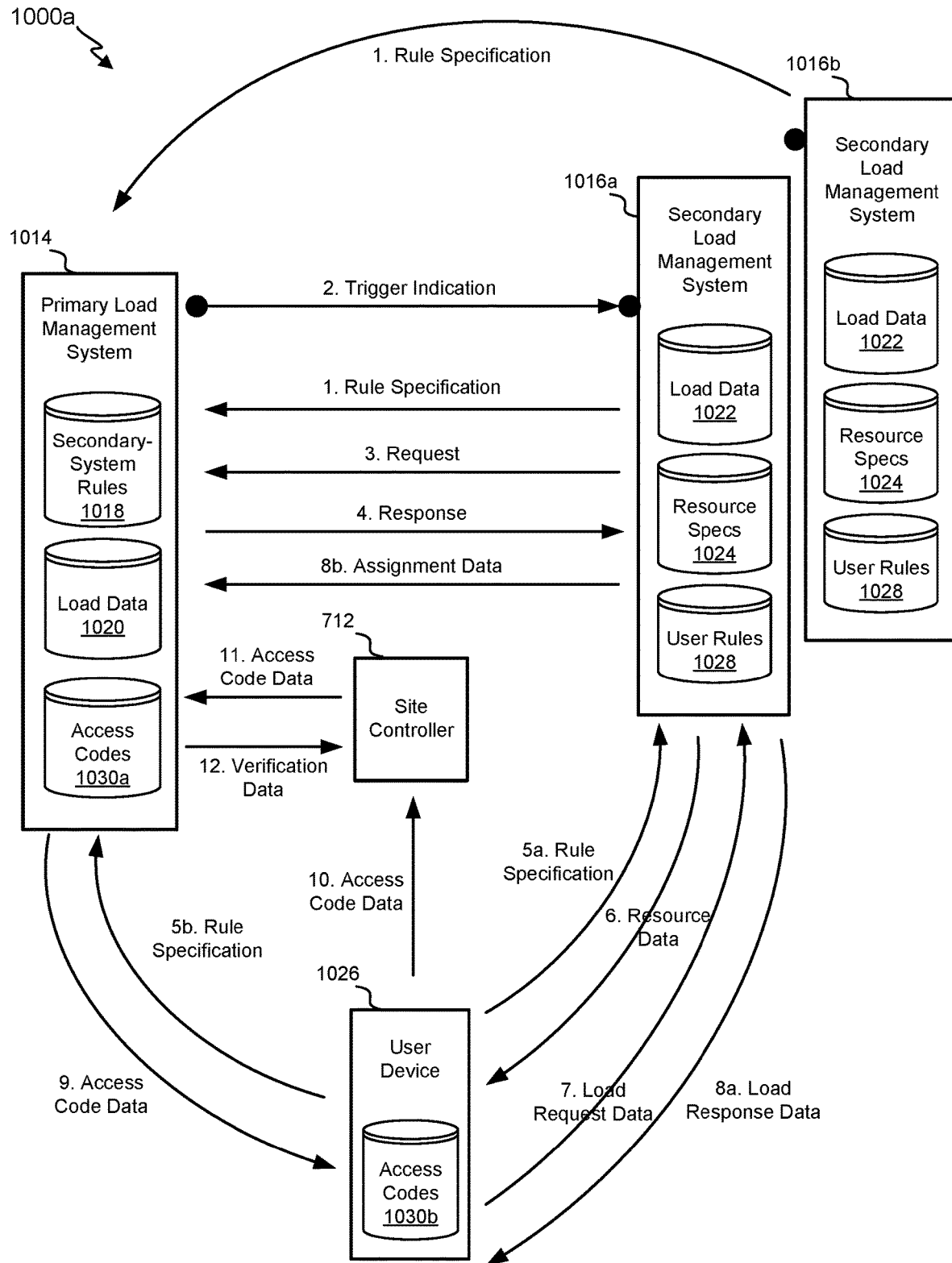
FIGS. 10A and 10B illustrate examples of communication exchanges involving primary and secondary load management systems.

Referring next to FIG. 10A, an example of a communication exchange 1000a involving primary load management system 1014 and each of a plurality of secondary load management systems 1016a, 1016b is shown. In some instances, secondary load management system 1016a is managed by an entity different than an entity that manages secondary load management system 1016b. Primary load management system 1014 may include and/or share properties with a primary assignment management system 214. Each of one or both of secondary load management system 1016a and 1016b may include or correspond to a secondary assignment system 216. Communications shown in FIG. 10 may be transmitted over one or more networks, such as network 270, the Internet and/or a short-range network.

In one instance, one of secondary load management system 1016a or 1016b is managed by a same entity as manages primary load management system 1014. In one instance, each of secondary load management system 1016 and 1016b is managed by an entity different than an entity managing primary load management system 1014. Primary load management system 1014 can include a system that, for example, manages a master access-right assignment data store, distributes access codes, performs verification data for access attempts, and so on. Secondary load management systems 1016a, 1016b can include systems that, for example, facilitate assignment of access codes to users. For example, secondary load management systems 1016a, 1016b can be configured to request allocation of access-right slots, which may result in a temporary or final allocation or assignment to the system, a hold on the access-right slots, and/or a distribution of data pertaining to the slot(s). Secondary load management systems 1016a, 1016b may then facilitate transmission of the access-right slots to one or more users and identify a user that has requested one or more particular access-right slots. The secondary load management system can then facilitate an assignment of the access-right slots by (for example) transmitting one or more access codes to the user device, identifying the user to primary load management system 1014 or updating assignment data.

Communication exchange 1000a begins with transmission of one or more rule specifications from each secondary load management system 1016a, 1016b to primary load management system 1014. The rule specification can include one or more request parameters identify parameters of a load requested for allocation. For example, a rule specification can include a specification pertaining to a size of a target load (e.g., corresponding to a number of access-right slots). The specification may include a particular number or a threshold. A rule specification can include a specification of a type of at least part of the load, such as one that identifies a resource or type of resource and/or one that identifies a characteristic of one or more access-right slots (e.g., a location). The specification may include a first allocation parameter that may identify a value for which access-right slots are being requested.

In some instances, a rule and/or request corresponds to a single resource, while in others, the rule and/or request corresponds to multiple resources. For example, a request may be for access-right results pertaining to each of three resources or to each resource available at a location in a season. Thus, in some instances, a rule specification identifies or is indicative of a number of resources. Resources may, but need not, be specifically identified in a rule specification, rule and/or request. For example, a rule specification may indicate that a defined number or range (e.g., 100-200) of access-right slots is requested for any given resource within a defined time period (e.g., year).

A rule specification can include an allocation parameter that identifies a parameter for allocating a load should it be allocated to the secondary load management system. To illustrate, secondary load management system 1016a, 1016b may be configured to receive allocations of access-right slots but to attempt to facilitate assignment of the access-right slots to users. Communication exchange 1000a can be configured so as to promote facilitated distribution to users upon allocation of access-right slots to a secondary load management system. Early provision of allocation parameters by a secondary load management system can promote such quick facilitated distribution.

For example, an allocation parameter can identify one or more communication channels (e.g., webpages, portals, information-distribution protocols, email addresses, etc.) for transmitting information pertaining to at least part of the load to each of one or more devices and/or an a second allocation parameter. This information may enable primary load management system 1014 to (for example) automatically provide information pertaining to allocated access-right slots via the communication channel(s) and/or to verify that allocation parameters comply with one or more primary-system rules (e.g., that may include an upper and/or lower threshold for an allocation parameter and/or limits on which communication channels may be used).

Primary load management system 1014 can define a rule for each secondary load management system 1016a, 1016b based on the rule specifications. The rules can be stored in a secondary system rules data store 1018.

Primary load management system 1014 can further include a load data store 1020. Load data store 1020 can include, for example, information pertaining to which access-right slots for a given resource are available and information pertaining to each of those slots. Load data store 1020 can further identify information pertaining to one or more defined loads, such as which access-right slots are corresponding to the load, to which secondary load management system a load has been allocated, whether an allocation includes any restrictions (e.g., time limits).

Primary load management system 1014 can assess whether a set of available access-right slots corresponds to request parameters identified in any secondary-system rules. For example, it can be determined whether a resource type corresponds to that specified in a request parameter, whether a quantity (and/or contiguous quantity) corresponds to that specified in a request parameter, whether a type of the access-right slots corresponds to that specified in a request parameter, and/or whether the quantity of access-right slots can be allocated for a value that corresponds to a first allocation parameter specified in a request parameter (e.g., the determination being based on defined values or thresholds associated with the access-right slots and/or a primary-system rule).

In some instances, it may be determined that request parameters identified in rules for multiple secondary load management system correspond to a same load or to a same at least part of a load. Primary load management system 1014 may include a switch, such as a content switch, that may evaluate a load, rules and/or systems to determine to which secondary load management system 1016 a load is to be allocated or identified. In these instances, the rules and/or systems may be prioritized to determine to which entity the load is to be allocated. The prioritization may depend on, for example, defined prioritizations of the systems, a time at which rule specifications were submitted (e.g., prioritizing early submission), a size parameter (e.g., prioritizing either lower or larger size requests), and/or first allocation parameters (e.g., prioritizing larger first allocation parameters).

It will be appreciated that, in various instances, a load may be generated in response to evaluation of a load (e.g., in an attempt to define a load that accords with request parameters), or a load may be first defined (e.g., based on which access-right slots remain available and/or distribution priorities of the primary load management system) and it is then determined which rule to which the load corresponds. In some instances, a primary-system rule as to which access-right slots are to be included in a load and/or a secondary-system rule as to which access-right slots are requested may depend on information, such as an environmental characterization corresponding to a resource, a throughput monitor and/or a discrepancy associated with a resource (e.g., a spread or line associated with a resource). In some instances, a primary-system rule and/or secondary-system rule may include a function that relates an environmental characteristic, throughput characteristic and/or discrepancy with an allocation parameter (e.g., such that larger discrepancies, poorer environmental characteristics and/or lower throughput prospects result in lower allocation parameters).

When it is determined that a load corresponds to a secondary-system rule (and/or any prioritization is performed), primary load management system can transmit a trigger indication to the associated secondary load management system 1016a. The trigger indication may identify characteristics of the load (e.g., a size, type of one or more access-right slots, resource, and/or allocation value). In some instances, the trigger indication may identify a rule and/or what specifications were defined in the triggered rule.

In some instances, communication exchange 1000a is configured so as to provide a secondary load management system 1016a a defined time period for transmitting a request responsive to a trigger indication. Access-right slots may, but need not, be placed on hold for the time period. Should a request not be received within the time period, primary load management system 1014 may transmit a same or different trigger indication to another secondary load management system with a rule corresponding to the load or may redefine a load so as to correspond with a rule of another secondary load management system and transmit a trigger indication accordingly. In some instances, a trigger indication is simultaneously transmitted to multiple secondary load management systems 1016, and a load may be allocated to a system that thereafter requests the load (e.g., in accordance with a first-responder or other secondary-system selection technique).

Secondary load management system 1016a can then transmit a request communication back to primary load management system that requests the load. Primary load management system 1014 can then transmit a response communication that confirms that the load is being allocated. In some instances, the response communication is transmitted subsequent to or in temporal proximity of a time at which a charge is issued or collected for the load. In some instances, then response communication includes further information about the load. For example, location of access-right slots in the load may be more precisely identified.

Secondary load management system 1016a can store data pertaining to the load in a load data store 1022. Load data store 1022 may further track statuses of access-right slots so as to be able to identify which access-right slots have been assigned to users. Secondary load management system 1016a can further manage and/or have access to a resource specification data store 1024 that can associate identifiers of various resources with corresponding information. The resource specifications may be, for example, included in a trigger-information or response communication from primary load management system 1014; identified via an external search (e.g., web crawl), and so on. Resource specifications may include, for example, a location and/or a date and time.

A user device 1026 can also transmit rule specifications to one or more of primary load management system 1014 and 1016a. The rule specifications may include request parameters, such as a size specification, type specification and/or assignment value (e.g., that may be precisely identified or a threshold). When rule specifications are transmitted and/or availed to secondary load management system 1016a, a corresponding user rule can be defined for the user device and/or user.

Secondary load management system 1016a can distribute data of a resource (or multiple resources) corresponding to the load allocated to the system. The resource data can include one or more resource specifications stored at resource specification data store 1024. The resource data may further include data associated with one or more access-right slots included in the load. For example, the resource data may identify a time and location of a resource and a location of each of one or more access-right slots. In some instances, the resource data further includes an allocation parameter, such as the second allocation parameter and/or one defined based thereupon included in a secondary-system rule specification or included in a rule associated with secondary load management system 1016a.

In some instances, secondary load management system 1016a controls the transmission of the resource data to one or more user devices 1026. In some instances, primary load management system 1014 facilitates the transmission. For example, the data may be identified in an interface provided, controlled and/or managed by secondary load management system 1016a, but primary load management system 1016 may have authorization to update the webpage, and thus primary load management system can update the secondary-system to include the resource data.

In some instances, resource data is selectively transmitted to user devices. For example, resource data may be transmitted only to the user devices associated with user rules corresponding with at least part of the load.

User device 1026 can request assignment of at least part of the load. The user request can identify, for example, one or more access-right slots (e.g., and/or one or more resources). Secondary load management system 1016a can evaluate the request and respond with load response data. Such a response may be conditioned (for example) on confirming completion of the assignment process. The load response data may (for example) indicate that the assignment has been accepted and/or include confirmation data. Upon such acceptance, secondary load management system 1016a can also transmit assignment data to primary load management system. The load data can include an identification of the user device (or corresponding information, such as a name, email, profile, device identifier or phone number of a corresponding user) and/or one or more access-right slots being assigned. Primary assignment management system can update an assignment data store and/or load data store 1020 to reflect the assignment.

Primary load management system 1014 can then retrieve access code data from an access code data store 1030 and transmit the access code data to user device 1026. The access code data can correspond to the one or more access rights being assigned to the user. The access code data can be transmitted (for example) immediately, at a defined time (e.g., relative to a time of a resource), or upon receiving a request (e.g., triggered by a user input or detecting that a user device has crossed a geofence corresponding to a resource).

User device 1026 can store the access code(s) in an access-code data store 1030b. Subsequently, user device 1026 can retrieve the access-code data and transmitting it to a site controller 712 (e.g., upon detecting the site controller, upon receiving a request from the site controller or in response to detecting a corresponding user input). Site controller 712 can include one located at a resource location. Site controller 712 can transmit the access-code data to primary load management system 1014, which can then determine whether the code is a valid code, has not been previously redeemed and/or corresponds to one or more characteristics (e.g., a resource associated with or identified by the site controller, a time, a device characteristic, etc.). A result of such determination(s) can be transmitted back to site controller 712 such that a user can then be granted or denied requested access to a resource.

It will be appreciated that one, more or all communications represented in communication exchange 1000a can be transmitted via (for example) a web site, a web portal, another portal, an email exchange, a message (e.g., SMS message) exchange, and/or an API.

It will be appreciated that part or all of a communication exchange can be performed in an automated or semi-automated manner. For example, one or more rules (e.g., secondary-system rules or user rules) can be defined so as to trigger automatic allocation or assignment upon detecting data that corresponds to request parameters in the rules. As another example, the one or more rules can be defined so as to trigger a notification communication to the user device or secondary load management system that includes an alert that the request parameters are satisfied and enable to user device or secondary load management system to transmit a request for allocation or assignment.

It will also be appreciated that various modifications to communication exchange 1000a are contemplated. For example, in one instance, secondary load management system 1016a may at least partly manage access codes. For example, one or more access codes corresponding to a load may be transmitted from primary load management system 1014 to secondary load management system 1016a as part of a response. Secondary load management system 1016a may then transmit select access codes to a user device 1026, and (in various instances) either primary load management system 1014 or secondary load management system 1016a may provide verification of the code to site controller 712.

Figure 10B:
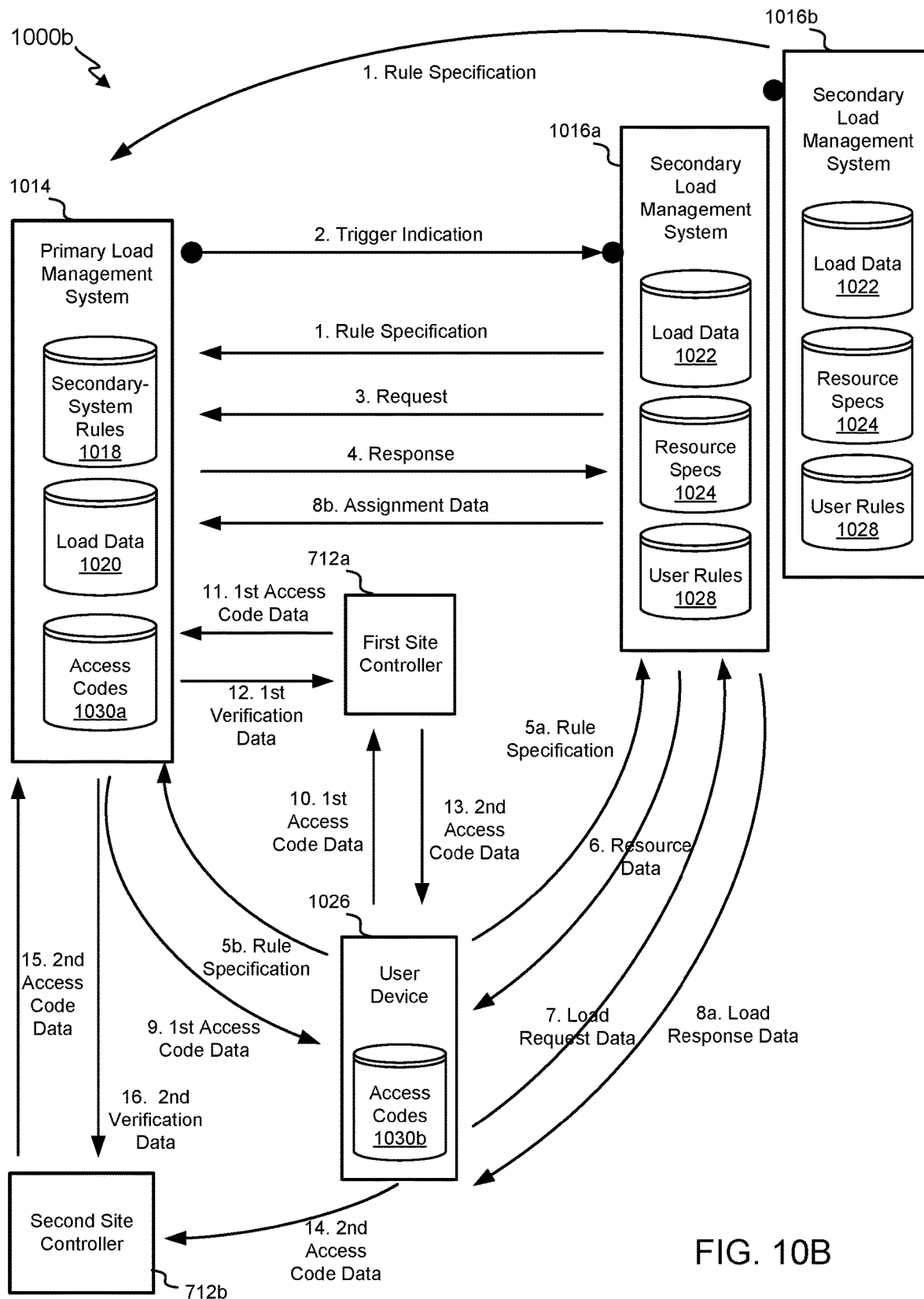

Referring next to FIG. 10B, another example of a communication exchange 1000b involving primary load management system 1014 and each of a plurality of secondary load management systems 1016a, 1016b is shown. In this instance, two different types of access code data are associated with an assignment.

As shown, in response to an initial assignment of an access-right slot, primary load management system 1014 transmits first access code data to user device 1026. The first access code data may include data representing that access to a resource has been authorized. However, in this instance, the first access code data may lack a precision of association that would associate the first access code data with one or more particular access characteristics. For example, the data may lack information that would identify a particular location within a resource area for which access is to be granted.

Subsequently (e.g., after a predefined time period, such as within a defined period from a resource time; and/or when a user device 1026 crosses a geofence corresponding to a resource, and/or when a user device 1026 receives input or a site-controller request indicating that access data is to be transmitted to a nearby site controller), user device 1026 may retrieve the first access code data and transmit it (e.g., via a short-range communication) to a first site controller 712a.

First site controller 712a may communicate with primary load management system 1014 to verify the data, in a manner similar to that described herein. Upon detecting that the first access code data has been verified, first site controller 712a can transmit second access code data to user device 1026. The second access code data have a precision of association that associates the data with one or more particular access characteristics. The second access code data may be, for example, generated at first site controller 712a or received from primary load management system (e.g., as part of the verification communication or as part of another communication). The particular access characteristics may be identified based on, for example, a technique described in U.S. application Ser. No. 14/063,929, filed on Oct. 25, 2013, which is hereby incorporated by reference in its entirety for all purposes. The particular access characteristics may be identified based on, for example, for which and/or how many access-right results first access code data had been previously verified and/or which and/or how many second access codes had been generated and/or transmitted.

The second access code data may indicate where access to a resource is authorized, and user device 1026 may thus move to a corresponding location. In some instance, a second site controller 712b is associated with the corresponding location. User device 1026 may then transmit the second access code data (e.g., when user device 1026 detects that it has crossed a geofence corresponding to the location and/or when user device 1026 receives input or a site-controller request indicating that access data is to be transmitted to a nearby site controller) to second site controller 712b. Second site controller 712b can determine whether the code is verified (e.g., valid, has not been previously used, and/or corresponds to the user device 1026 and/or location). The determination can include (for example) transmitting the second access code data to another device (e.g., primary load management system 1014, a local server, or another site controller, such as first site controller 712a) and receiving second verification data that indicates whether the second access code data is verified. The determination can, alternatively or additionally, include a local determination, which may be based (for example) on comparing the second access code data to data in a local access-code data store to determine whether there is a match and/or whether the second access code data (or corresponding access code data that is associated with same one or more particular characteristics) has been previously verified. The local access-code data store may be populated by second site controller 712b, for example, in response to communications from one or more other site controllers and/or primary load management system 1014 that identify second access code data that have been issued.

Figure 11:
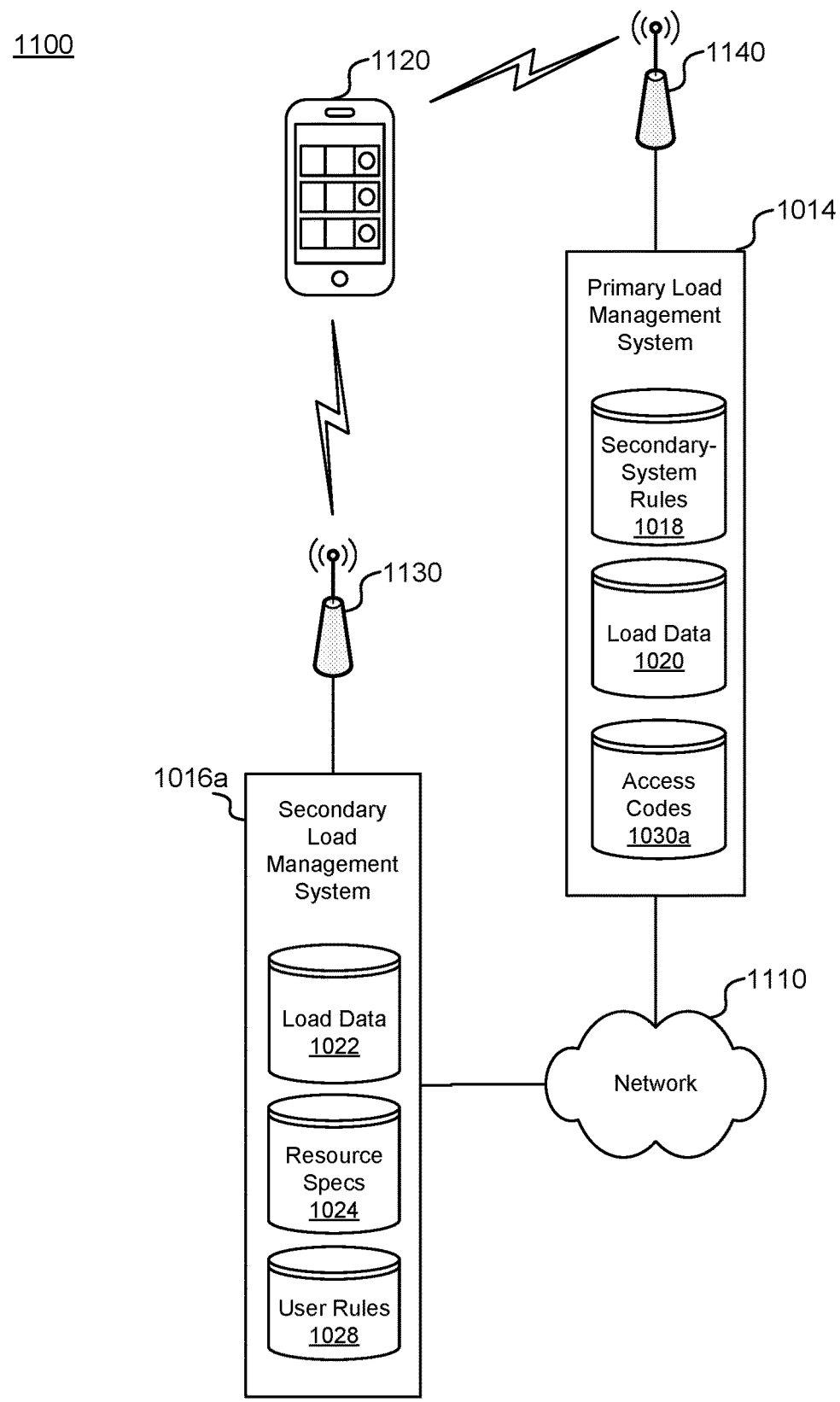
FIG. 11 is a block diagram illustrating a network environment including a primary load management system and a secondary load management system, according to some aspects.

FIG. 11 is a block diagram illustrating network environment 1100 including primary load management system 1014 and a secondary load management system 1016a. User device 1120 can communicate with primary load management system 1014 and/or secondary load management system 1016a through network 1110. For example, user device 1120 can wirelessly communicate with either gateway 1130 or gateway 1140 to access the primary load management system 1014 or the secondary load management system 1016a, respectively. While FIG. 11 illustrates the example of the primary load management system 1014 and the secondary load management system 1016a being separate systems, it will be appreciated that the primary load management system 1014 and the secondary load management system 1016a may operate within the same network environment, may be operated by the same entity (e.g., by the same company), and/or may run on the same one or more servers. While FIG. 11 illustrates an example of a single user device communicating with a single primary load management system and/or a single secondary load management system, it will be appreciated that any number of user devices, primary load management systems, secondary load management systems, gateways, and any other device not shown may be included in network environment 1100. Further, user device 1120 can be any computing device operated by a user (portable or non-portable), and thus, it will be appreciated that user device 1120 can communicate with primary load management system 1014 and/or secondary load management system 1016a by wired and/or wireless signals.

User device 1120 can communicate with secondary load management system 1016a to query one or more databases that store assigned access rights to resources (e.g., access rights that are already assigned to users and potentially available for reassignment based on an instruction from the access-right holder). For example, assigned access rights to resources may be one or more access rights to at least one particular resource that have previously been assigned to a user or user device. That user may not be able to access the resource using the assigned access right, and thus, the user assigned to the access right may want to reassign the assigned access right to another user using the secondary load management system 1016a. The access-right holder may transmit an instruction to the secondary load management system 1016a to make the assigned access right available for reassignment to other users. If an access-right requestor does request the reassignment of the assigned access right using the secondary load management system 1016a, and then completes the reassignment process (e.g., the purchase process), then the secondary load management system 1016a can reassign the previously-assigned access right to the access-right requestor, thereby enabling the access-right requestor, and not the access-right holder, to gain access to the resource associated with the access right. A notification may or may not be transmitted to the primary load management system 1014 for notification of the reassignment of the access right.

To illustrate and only as a non-limiting example, a user may access the secondary load management system 1016a using user device 1120. Upon accessing the secondary load management system 1016a, the secondary load management system 1016a can retrieve a user profile and/or any other data associated with the user from an internal or external data source at the backend servers (e.g., without the user noticing). The user may be presented with an interface that enables the user to query access rights that are currently assigned to other users. The user may generate queries for access rights using the interface to find a suitable access right for requesting reassignment. Further, when the user selects a suitable access right, the user may transmit an indication to initiate a reassignment process. The reassignment process may include one or more actions that facilitate the generation of the reassignment value condition and the enabling of the user to satisfy the reassignment value condition. As a non-limiting example, the reassignment process may include actions that enable the user to purchase the access right.

Upon transmitting the indication to initiate the reassignment process, the secondary load management system 1016a may transmit the retrieved user profile and/or any other retrieved data associated with the user to a value determination system (not shown). The value determination system may operate as a system within or be hosted by the primary and/or secondary load management systems. Further, the value determination system may process the user profile and/or any other retrieved data associated with the user by generating contextual information for the user and/or for the resource associated with the suitable access right. For example, the context for a user or event may be one or more data vectors representing contextual information associated with the user or resource. A data vector may include a data mapping between data field identifiers and data field values (e.g., "historical interactions" as the field name and "6" as the field value, and so on). The contextual information of the user or resource may then be inputted into a contextual machine-learning model (as described herein and above) to generate an output predictive of the value to use as a value component of the reassignment value condition. The secondary load management system 1016a may enable the user to satisfy the reassignment value condition (e.g., now that the value component has been predicted and is used to determine the reassignment value condition).

Advantageously, the contextual machine-learning model is generated in advance based on the collected data sets by primary load management system 1014 based on previous user interactions or by secondary load management system 1016a based on previous user interactions. When the contextual information generated for the user is limited (e.g., thin data), for example, because the user is a new user, the value determination system can still accurately generate value predictions because the contextual machine-learning model may include data vectors representing previous new users who are similar and who previously requested reassignment of access rights.

Figure 12:
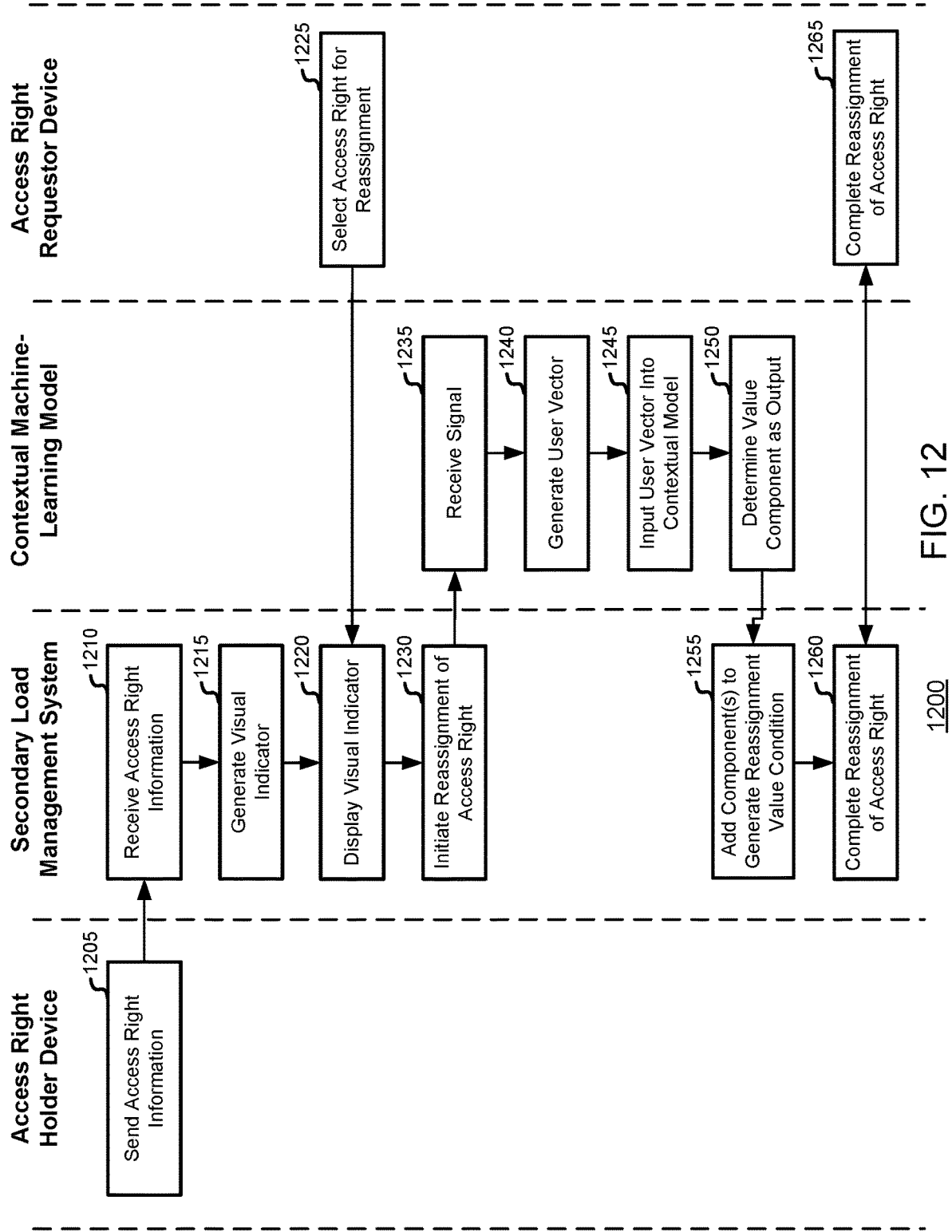
FIG. 12 is a swim lane diagram illustrating a process of determining value components of the reassignment value condition for assigned access rights to be reassigned, according to some aspects.

FIG. 12 is a swim lane diagram illustrating process 1200 for intelligently generating value predictions for reassignment value conditions. At block 1205, an access right holder device may transmit access right information to the secondary load management system. For example, transmitting access right information may include a user identifier of the access right holder. At block 1210, the secondary load management system can receive the access right information. At block 1215, the secondary load management system can generate a visual indicator to display on an interface of the secondary load management system. The visual indicator (e.g., a posting) can be generated based on the access right information received from the access-right holder device. At block 1220, the secondary load management system can display the generated visual indicator on the interface, thereby enabling other users to request reassignment of that access right. At block 1225, at a later time, another user, such as the access-right requestor device operated by an access-right requestor, may query for assigned access rights available for reassignment that satisfy a particular constraint. At block 1230, the secondary load management system can initiate the reassignment process for the access right in response to receiving a signal that the access-right requestor device has initiated the reassignment process. At block 1235, the contextual bandit learner may receive a signal indicating that the reassignment process has been initiated. At block 1240, the contextual bandit learner can generate a user vector to represent contextual information of the access-right requestor device. The user vector may be the contextual information of the user or the resource, as described above in the present disclosure. For example, the user vector may be generated based on a user profile associated with the user or based on the resource associated with the access right that is the subject of the reassignment process. The user vector may be a data vector (including a mapping of field name to field value for any number of field names and field value pairs) that includes a representation of the user's historical data collected by the primary and/or secondary load management systems. At block 1245, the user vector is inputted into a contextual machine-learning model. For example, the contextual machine-learning model may be generated based on the data collected by the primary load management system from users requesting assignment of access rights. The contextual machine-learning model may be generated using one or more algorithms associated with the contextual bandit learner techniques. At block 1250, the output generated by inputting the user vector into the contextual machine-learning model may correspond to a prediction of the value of a value component of the reassignment value condition for that access right and user combination. At block 1255, the reassignment value condition may be generated by combining the one or more value components generated by the contextual machine-learning model. At block 1260, the secondary load management system can complete the reassignment process to reassign the assigned access right from the access-right holder to the access right requestor. At block 1265, the reassignment process is completed at the access-right requestor's device and, for example, the access-right requestor's device is sent a digital access-enabling code associated with the reassigned access right.

Figure 13:
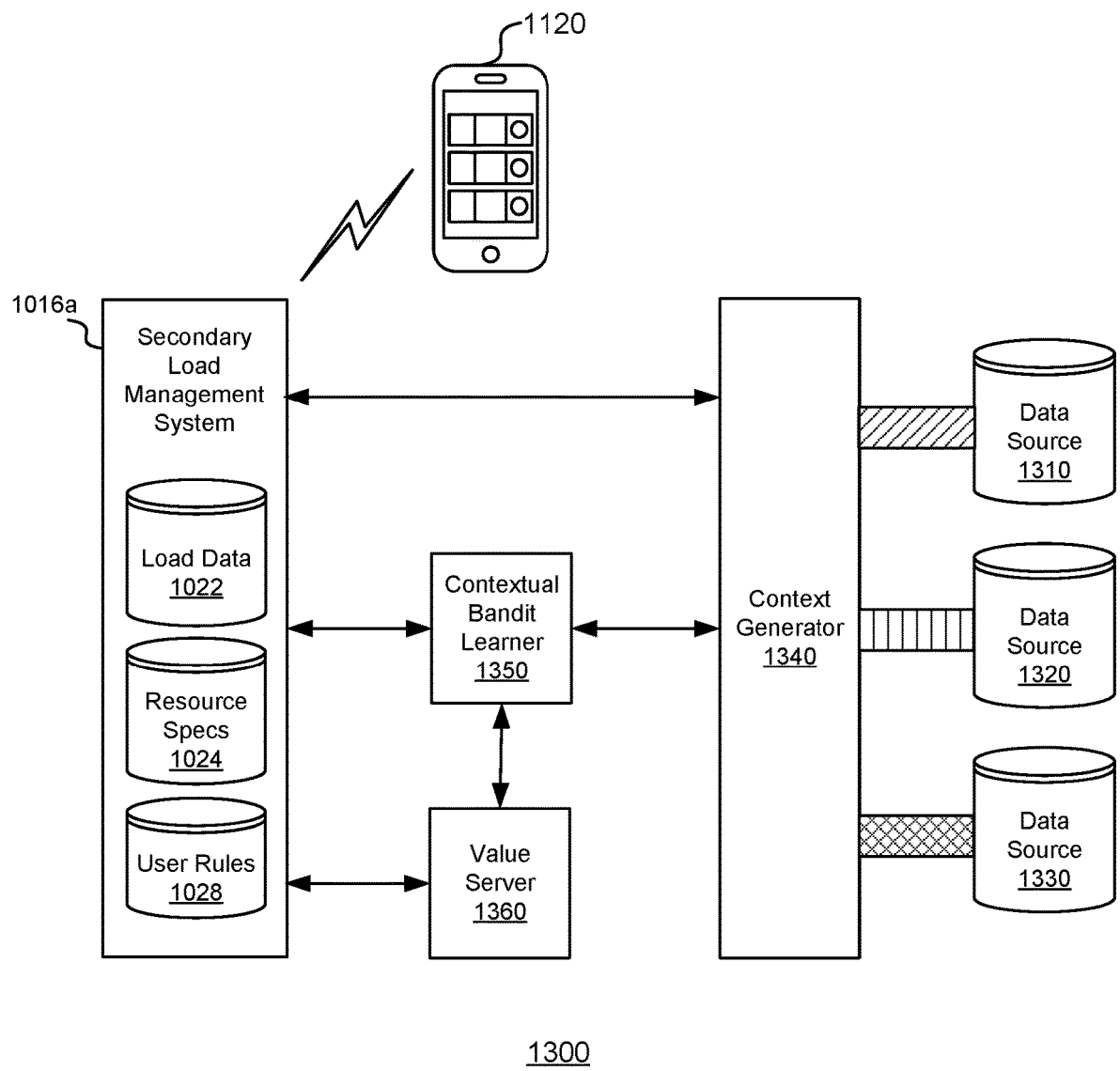
FIG. 13 is a block diagram illustrating a network environment that uses artificial intelligence and/or machine-learning techniques to determine the value components of a reassignment value condition of an assigned access right available for reassignment, according to some aspects.

FIG. 13 is a block diagram illustrating network environment 1300 that uses artificial intelligence and/or machine-learning techniques to generate value predictions. Network environment 1300 can include user device 1120 communicating with secondary load management system 1016a over a wired or wireless communication channel. When certain situations occur, such as when the reassignment process is initiated, then secondary load management system 1016a may transmit a signal to context generator 1340 to generate contextual information for the user (e.g., a data vector). Non-limiting examples of what the generated contextual information can represent include the identifier of the access-right requestor, the resource identifier, the location of the resource, the weather, the time of year, and other suitable aspects. Further, as described in greater detail above, generating the contextual information of a user may include accessing the historical data associated with the user from the primary load management system (e.g., accessing the historical interactions between the user and the primary load management system), and generating a data vector (e.g., a data structure including one or more field name-field value pairs) that represents the historical contextual information of that particular user. It will be appreciated that the contextual information can be generated based on data retrieved from any data source, including internal data sources, external data sources, data sources operated or managed by the primary load management system, data sources operated or managed by the secondary load management system, data sources operated or managed by third-parties, and any other suitable data source. As a non-limiting example, data sources 1310 through 1330 illustrated in FIG. 13 may be managed by the primary load management system, and may store user profile data associated with the user operating user device 1120 and/or historical interactions between the user and the primary or secondary load management systems. The historical interaction data may include information about access rights previously requested for assignment or reassignment. Advantageously, the contextual information (for the user or resource, etc.) can be generated based on the data collected by the primary load management system, even though the secondary load management system performs the reassignment process. The data collected by the primary load management system can include any collectible or determinable data from users who access the primary load management system. Generating the contextual information representing the access-right requestor using the data set collected by the primary load management system enables the secondary load management system to technically solve the "cold start" or "thin data" problem experienced with new users. Executing one or more machine-learning algorithms and/or artificial intelligence algorithms, such as the contextual bandit learning with an exploration protocol (e.g., a reinforcement learner), on the data set collected by the primary load management system enables the secondary load management system to generate accurate value predictions for the reassignment value condition, even for new users for which the primary and/or secondary load management systems have not collected much or any data.

Once the contextual information is generated, the contextual information can be fed into the contextual bandit learner 1350. Contextual bandit learner 1350 can be a contextual machine-learning model that can be used to evaluate the context of the user or the resource, for example. For example, one or more contextual bandit learning techniques (with one or more reinforcement learning techniques, such as an exploration protocol) can be used to process the context of the user or event and output a prediction of which values to use as the value component for the reassignment value condition.

The predicted value of the value component is transmitted to the value server 1360, which calculates the reassignment value condition to present to the access-right requestor when completing the reassignment process. The value server 1360 then transmits the reassignment value condition to the secondary load management system 1016a so that the reassignment load management system can be presented to the access-right requestor on the interface generated by the secondary load management system. It will be appreciated that the present disclosure is not limited to executing contextual multi-armed bandit techniques to select the value of the value component of the reassignment value condition. Accordingly, any reinforcement learning or other intelligent selection technique may be executed in lieu of or in addition to the contextual multi-armed bandit algorithms.

Figure 14:
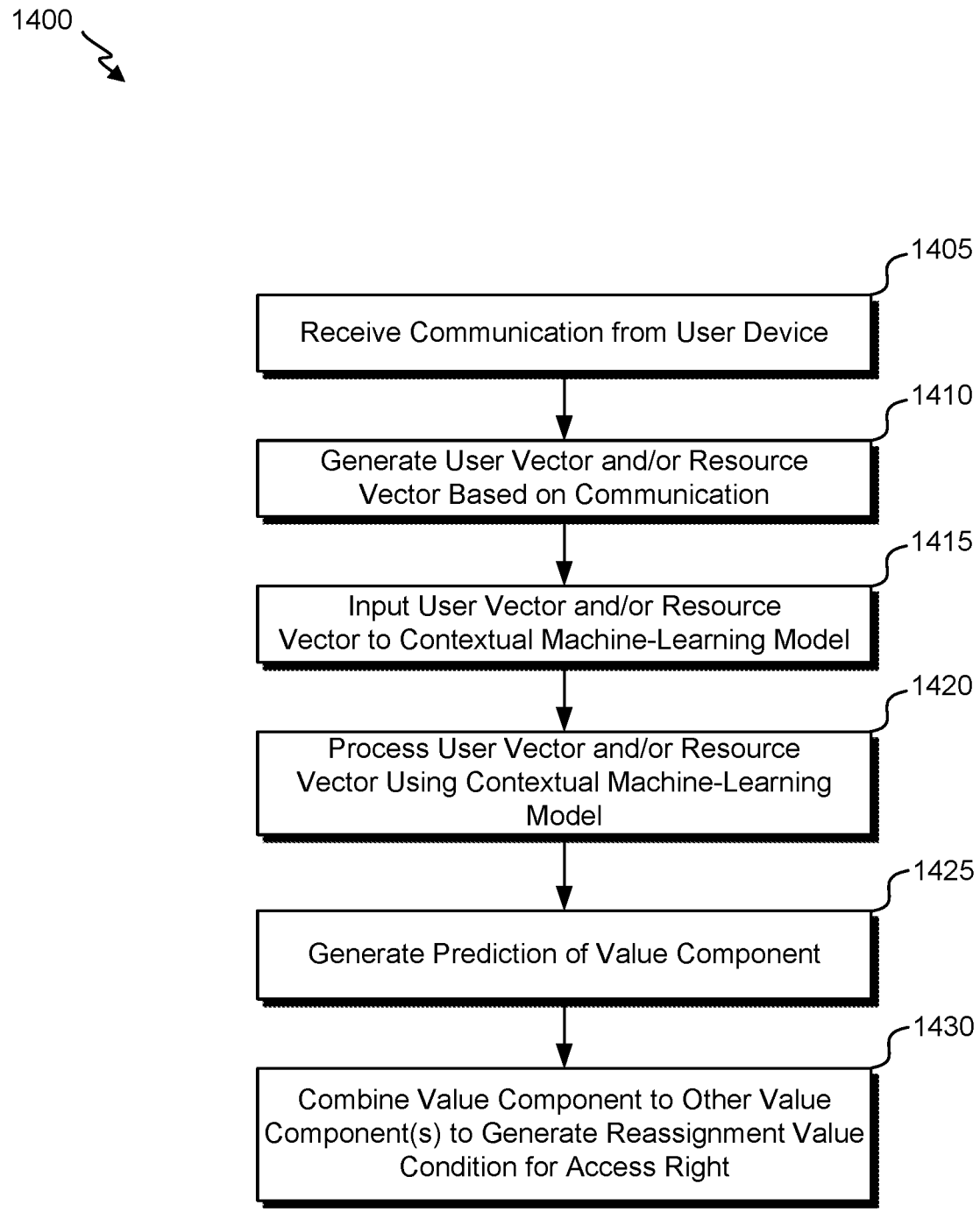
FIG. 14 is a flowchart illustrating a process for determining the value components of a reassignment value condition of an assigned access right available for reassignment, according to some aspects.

FIG. 14 is a flowchart illustrating process 1400 for intelligently generating value predictions for the value component of a reassignment value condition. Process 1400 can be performed at least in part by the primary load management system and/or the secondary load management system. At block 1405, the secondary load management system can receive a communication from a user device. For example, a user can be browsing an interface of a reassignment platform (e.g., operated by the secondary load management system), and the user can query for assigned access rights that are available for reassignment and that meet certain constraints. At block 1410, upon detecting the user initiated the reassignment process for a particular access right (while navigating the interface and potentially selecting a selectable link or button), a user vector and/or a resource vector can be generated to represent the user. In some implementations, the user vector can be generated when the user initially accesses the reassignment platform, and the resource vector can be generated when the user selects an assigned access right for reassignment and/or initiates the reassignment process. However, the present disclosure is not limited thereto, and thus, the user vector and/or the resource vector can be generated at any time. As described above, the user vector can represent the contextual information of the user, and the resource vector can represent the contextual information of the resource. For example, the contextual information of the user or resource can be a data vector that includes data field name-data field value pairs of historical interaction data between the user and the primary or secondary load management systems or third-party data. At blocks 1415 and 1420, the user vector and/or the resource vector can be transmitted to the contextual bandit leaner (which is configured to execute reinforcement learning techniques), and the user vector and/or the resource vector can be inputted into and processed by the contextual machine-learning model of the contextual bandit learner. At block 1425, the output of the contextual machine-learning model may represent a prediction of which value to select for the value component of the reassignment value condition determined for the assigned access right that is subject to the request for reassignment. At block 1430, the predicted value of the value component is potentially added to the other value components, if any, to generate the reassignment value condition that the user needs to satisfy if the user wants to complete the reassignment process and reassign the assigned access right to the user.

All patents, publications and abstracts cited above are incorporated herein by reference in their entirety. Various embodiments have been described. It should be recognized that these embodiments are merely illustrative of the principles of the present disclosure. Numerous modifications and adaptations thereof will be readily apparent to those skilled in the art without departing from the spirit and scope of the present disclosure as defined in the following claims.

What is claimed is:

1. A computer-implemented method, comprising:
   collecting, at a primary load management system, a data set from a plurality of user devices, the data set including one or more attributes associated with an interaction between a user device of the plurality of user devices and the primary load management system;
   receiving, at an interface, a constraint for querying one or more databases, the constraint being received from an access-right requestor device;
   querying the one or more databases using the constraint, the querying causing one or more assigned access rights of a set of assigned access rights to be identified, each assigned access right of the one or more assigned access rights satisfying the constraint;

displaying, at the interface, the one or more assigned access rights that satisfy the constraint;

receiving a signal from the access-right requestor device, the signal requesting that a particular assigned access right of the one or more assigned access rights be reassigned to the access-right requestor device, the particular assigned access right having been assigned to a particular access-right holder and granting access to the particular access-right holder to access a particular resource;

generating a context vector associated with the access-right requestor device, the context vector being generated based on one or more features associated with an access-right requestor associated with the access-requestor device, the access-right requestor device, or the particular assigned access right;

inputting the context vector into a trained contextual machine-learning model, the trained contextual machine-learning model having been trained using the collected data set, the trained contextual machine-learning model generating an output corresponding to a prediction of a value to use as a value component of a reassignment value condition specific to the particular assigned access right; and displaying, at the interface, the reassignment value condition of the particular assigned access right, the reassignment value condition being determined based on a combination of the one or more value components including the predicted value used as the value component, and the reassignment value condition, once satisfied, enabling the particular assigned access right to be reassigned from the particular access-right holder to the access-right requestor associated with the access-right requestor device.

2. The computer-implemented method of claim 1, further comprising:

receiving, at a secondary load management system, a communication from the access-right requestor device, the communication enabling the access-right requestor device to request reassignment of access rights to resources using the secondary load management system, and the access-right requestor device being operated by the access-right requestor; and displaying, at the access-right requestor device, an interface that enables the access-right requestor device to generate a query for one or more databases storing a set of assigned access rights to one or more resources, and each assigned access right of the set of assigned access rights having been assigned to an access-right holder and being available for reassignment to other users.

3. The computer-implemented method of claim 1, further comprising:

receiving, at the primary load management system, an additional signal from the access-right requestor device, the additional signal indicating that the access-right requestor has completed a reassignment of the particular access right associated with the reassignment value condition, and the additional signal representing a feedback to the contextual machine-learning model; and updating the contextual machine-learning model in response to receiving the additional signal, the updated contextual machine-learning model biasing future predictions by the contextual machine-learning model towards the predicted value.

4. The computer-implemented method of claim 1, further comprising:

training the contextual machine-learning model using the collected data set, the contextual machine-learning model being trained based on one or more contextual multi-armed bandit techniques, and the contextual machine-learning model representing one or more detected patterns between data points of the collected data set.

5. The computer-implemented method of claim 1, further comprising:

comparing the context vector against another context vector of another access-right requestor device that previously requested access to a secondary load management system;

determining a cluster to associate with the another access-right requestor device based on a result of the comparison; and generating the prediction of the value used as the value component of one or more value components based on a result of inputting the other context vector into the contextual machine-learning model.

6. The computer-implemented method of claim 1, wherein the primary load management system is configured to process a request for assigning an access right to a user, and wherein a secondary load management system is configured to process the request for reassigning the access right from the user to another user.

7. The computer-implemented method of claim 1, further comprising:

determining that the access-right requestor device satisfied a reassignment condition associated with the particular assigned access right; and reassigning the particular assigned access right from the access-right holder to the access-right requestor, and the reassignment of the particular assigned access right to the access-right requestor enabling the access-right requestor to gain access to the particular resource, instead of the access-right holder.

8. A system, comprising:

one or more processors; and a non-transitory computer-readable storage medium containing instructions which, when executed on the one or more processors, cause the one or more processors to perform operations including:

collecting, at a primary load management system, a data set from a plurality of user devices, the data set including one or more attributes associated with an interaction between a user device of the plurality of user devices and the primary load management system;

receiving, at an interface, a constraint for querying one or more databases, the constraint being received from an access-right requestor device;

querying the one or more databases using the constraint, the querying causing one or more assigned access rights of a set of assigned access rights to be identified, each assigned access right of the one or more assigned access rights satisfying the constraint;

displaying, at the interface, the one or more assigned access rights that satisfy the constraint;

receiving a signal from the access-right requestor device, the signal requesting that a particular assigned access right of the one or more assigned access rights be reassigned to the access-right requestor device, the particular assigned access right having been assigned to a particular access-right holder and granting access to the particular access-right holder to access a particular resource;

generating a context vector associated with the access-right requestor device, the context vector being generated based on one or more features associated with an access-right requestor associated with the access-requestor device, the access-right requestor device, or the particular assigned access right;

inputting the context vector into a trained contextual machine-learning model, the trained contextual machine-learning model having been trained using the collected data set, the trained contextual machine-learning model generating an output corresponding to a prediction of a value to use as a value component of a reassignment value condition specific to the particular assigned access right; and displaying, at the interface, the reassignment value condition of the particular assigned access right, the reassignment value condition being determined based on a combination of the one or more value components including the predicted value used as the value component, and the reassignment value condition, once satisfied, enabling the particular assigned access right to be reassigned from the particular access-right holder to the access-right requestor.

9. The system of claim 8, wherein the operations further comprise:

receiving, at a secondary load management system, a communication from the access-right requestor device, the communication enabling the access-right requestor device to request reassignment of access rights to resources using the secondary load management system, and the access-right requestor device being operated by the access-right requestor; and displaying, at the access-right requestor device, an interface that enables the access-right requestor device to generate a query for one or more databases storing a set of assigned access rights to one or more resources, and each assigned access right of the set of assigned access rights having been assigned to an access-right holder and being available for reassignment to other users.

10. The system of claim 8, wherein the operations further comprise:

receiving, at the primary load management system, an additional signal from the access-right requestor device, the additional signal indicating that the access-right requestor has completed a reassignment of the particular access right associated with the reassignment value condition, and the additional signal representing a feedback to the contextual machine-learning model; and updating the contextual machine-learning model in response to receiving the additional signal, the updated contextual machine-learning model biasing future predictions by the contextual machine-learning model towards the predicted value.

11. The system of claim 8, wherein the operations further comprise:

training the contextual machine-learning model using the collected data set, the contextual machine-learning model being trained based on one or more contextual multi-armed bandit techniques, and the contextual machine-learning model representing one or more detected patterns between data points of the collected data set.

12. The system of claim 8, wherein the operations further comprise:

comparing the context vector against another context vector of another access-right requestor device that previously requested access to a secondary load management system;

determining a cluster to associate with the another access-right requestor device based on a result of the comparison; and generating the prediction of the value used as a value component of the one or more value components based on a result of inputting the other context vector into the contextual machine-learning model.

13. The system of claim 8, wherein the primary load management system is configured to process a request for assigning an access right to a user, and wherein a secondary load management system is configured to process the request for reassigning the access right from the user to another user.

14. The system of claim 8, wherein the operations further comprise:

determining that the access-right requestor device satisfied a reassignment condition associated with the particular assigned access right; and reassigning the particular assigned access right from the access-right holder to the access-right requestor, and the reassignment of the particular assigned access right to the access-right requestor enabling the access-right requestor to gain access to the particular resource, instead of the access-right holder.

15. A computer-program product tangibly embodied in a non-transitory machine-readable storage medium, including instructions configured to cause a data processing apparatus to perform operations including:

collecting, at a primary load management system, a data set from a plurality of user devices, the data set including one or more attributes associated with an interaction between a user device of the plurality of user devices and the primary load management system;

receiving, at an interface, a constraint for querying one or more databases, the constraint being received from an access-right requestor device;

querying the one or more databases using the constraint, the querying causing one or more assigned access rights of a set of assigned access rights to be identified, each assigned access right of the one or more assigned access rights satisfying the constraint;

displaying, at the interface, the one or more assigned access rights that satisfy the constraint;

receiving a signal from the access-right requestor device, the signal requesting that a particular assigned access right of the one or more assigned access rights be reassigned to the access-right requestor device, the particular assigned access right having been assigned to a particular access-right holder and granting access to the particular access-right holder to access a particular resource;

generating a context vector associated with the access-right requestor device, the context vector being generated based on one or more features associated with an access-right requestor associated with the access-requestor device, the access-right requestor device, or the particular assigned access right;

inputting the context vector into a trained contextual machine-learning model, the trained contextual machine-learning model having been trained using the collected data set, the trained contextual machine-learning model generating an output corresponding to a prediction of a value to use as a value component of a reassignment value condition specific to the particular assigned access right; and displaying, at the interface, the reassignment value condition of the particular assigned access right, the reassignment value condition being determined based on a combination of the one or more value components including the predicted value used as the value component, and the reassignment value condition, once satisfied, enabling the particular assigned access right to be reassigned from the particular access-right holder to the access-right requestor.

16. The non-transitory machine-readable storage medium of claim 15, wherein the operations further comprise:

receiving, at a secondary load management system, a communication from the access-right requestor device, the communication enabling the access-right requestor device to request reassignment of access rights to resources using the secondary load management system, and the access-right requestor device being operated by the access-right requestor; and displaying, at the access-right requestor device, an interface that enables the access-right requestor device to generate a query for one or more databases storing a set of assigned access rights to one or more resources, and each assigned access right of the set of assigned access rights having been assigned to an access-right holder and being available for reassignment to other users.

17. The non-transitory machine-readable storage medium of claim 15, wherein the operations further comprise:

receiving, at the primary load management system, an additional signal from the access-right requestor device, the additional signal indicating that the access-right requestor has completed a reassignment of the particular access right associated with the reassignment value condition, and the additional signal representing a feedback to the contextual machine-learning model; and updating the contextual machine-learning model in response to receiving the additional signal, the updated contextual machine-learning model biasing future predictions by the contextual machine-learning model towards the predicted value.

18. The non-transitory machine-readable storage medium of claim 15, wherein the operations further comprise:

training the contextual machine-learning model using the collected data set, the contextual machine-learning model being trained based on one or more contextual multi-armed bandit techniques, and the contextual machine-learning model representing one or more detected patterns between data points of the collected data set.

19. The non-transitory machine-readable storage medium of claim 15, wherein the operations further comprise:

comparing the context vector against another context vector of another access-right requestor device that previously requested access to a secondary load management system;

determining a cluster to associate with the another access-right requestor device based on a result of the comparison; and generating the prediction of the value used as the value component of the one or more value components based on a result of inputting the other context vector into the contextual machine-learning model.

20. The non-transitory machine-readable storage medium of claim 15, wherein the primary load management system is configured to process a request for assigning an access right to a user, and wherein a secondary load management system is configured to process the request for reassigning the access right from the user to another user.

* * * * *